(12) United States Patent
Camarota et al.

(10) Patent No.: US 7,374,319 B2
(45) Date of Patent: May 20, 2008

(54) LIGHTED HANDLE

(75) Inventors: Richard J. Camarota, Holland, MI (US); Richard Hartmann, Jr., Holland, MI (US)

(73) Assignee: ITC, Incorporated

( * ) Notice: Subject to any disclaimer, the term of this patent is extended or adjusted under 35 U.S.C. 154(b) by 0 days.

(21) Appl. No.: 10/613,143

(22) Filed: Jul. 3, 2003

(65) Prior Publication Data
US 2004/0062047 A1 Apr. 1, 2004

Related U.S. Application Data

(63) Continuation-in-part of application No. 09/999,814, filed on Oct. 31, 2001, now Pat. No. 6,592,240.

(51) Int. Cl.
*F21V 21/08* (2006.01)
(52) U.S. Cl. .................................. 362/399; 16/110.1
(58) Field of Classification Search ............... 362/399; 16/110.1
See application file for complete search history.

(56) References Cited

U.S. PATENT DOCUMENTS

| | | |
|---|---|---|
| 1,203,576 A | 11/1916 | Broadhead |
| 2,242,981 A | 5/1941 | Pedersen |
| 2,479,500 A | 8/1949 | Longberg |
| 4,231,077 A | 10/1980 | Joyce et al. |
| 4,274,131 A | 6/1981 | Praamsma |
| 4,924,357 A | 5/1990 | Yamashita et al. |
| 5,297,010 A * | 3/1994 | Camarota et al. ........... 362/501 |
| 5,339,228 A | 8/1994 | Baethge et al. |
| 5,396,740 A | 3/1995 | Bocchi |
| 5,692,822 A | 12/1997 | Dreyer |
| 5,957,566 A | 9/1999 | Chiu |
| 6,058,230 A | 5/2000 | Ward |
| 6,065,852 A * | 5/2000 | Crumley ..................... 362/146 |
| 6,135,621 A | 10/2000 | Bach et al. |
| 6,139,174 A | 10/2000 | Butterworth |
| 6,267,492 B1 | 7/2001 | Reid et al. |
| 6,375,343 B1 * | 4/2002 | Fujisawa et al. ............ 362/577 |
| 6,478,442 B2 * | 11/2002 | Chen ......................... 362/119 |
| 6,488,397 B1 | 12/2002 | Masutani et al. |
| 6,511,214 B1 * | 1/2003 | Parsons et al. ............. 362/398 |
| 6,553,629 B2 * | 4/2003 | Grady et al. .................. 16/444 |

OTHER PUBLICATIONS

Photocopy of the cover, first page (bearing the date indication Mar. 2002), p. 22 and 23, and the rear cover of an advertising catalog of the present Assignee ITC Incorporated (5 sheets).

* cited by examiner

*Primary Examiner*—Hargobind S. Sawhney
(74) *Attorney, Agent, or Firm*—Jonathan P. O'Brien; Kelly T. Murphy; Miller Canfield, PLC

(57) ABSTRACT

A lighted handle includes an elongate light transmitting member that has first and second end portions. First and second support surface engageable mounting brackets carry the first and second end portions of the light transmitting member. A narrow beam light emitter is located in the first mounting bracket and has a light beam emitting end. The light beam emitting end faces the adjacent first end portion of the light transmitting member and is aimed longitudinally along the light transmitting member to make the same more visible.

28 Claims, 28 Drawing Sheets

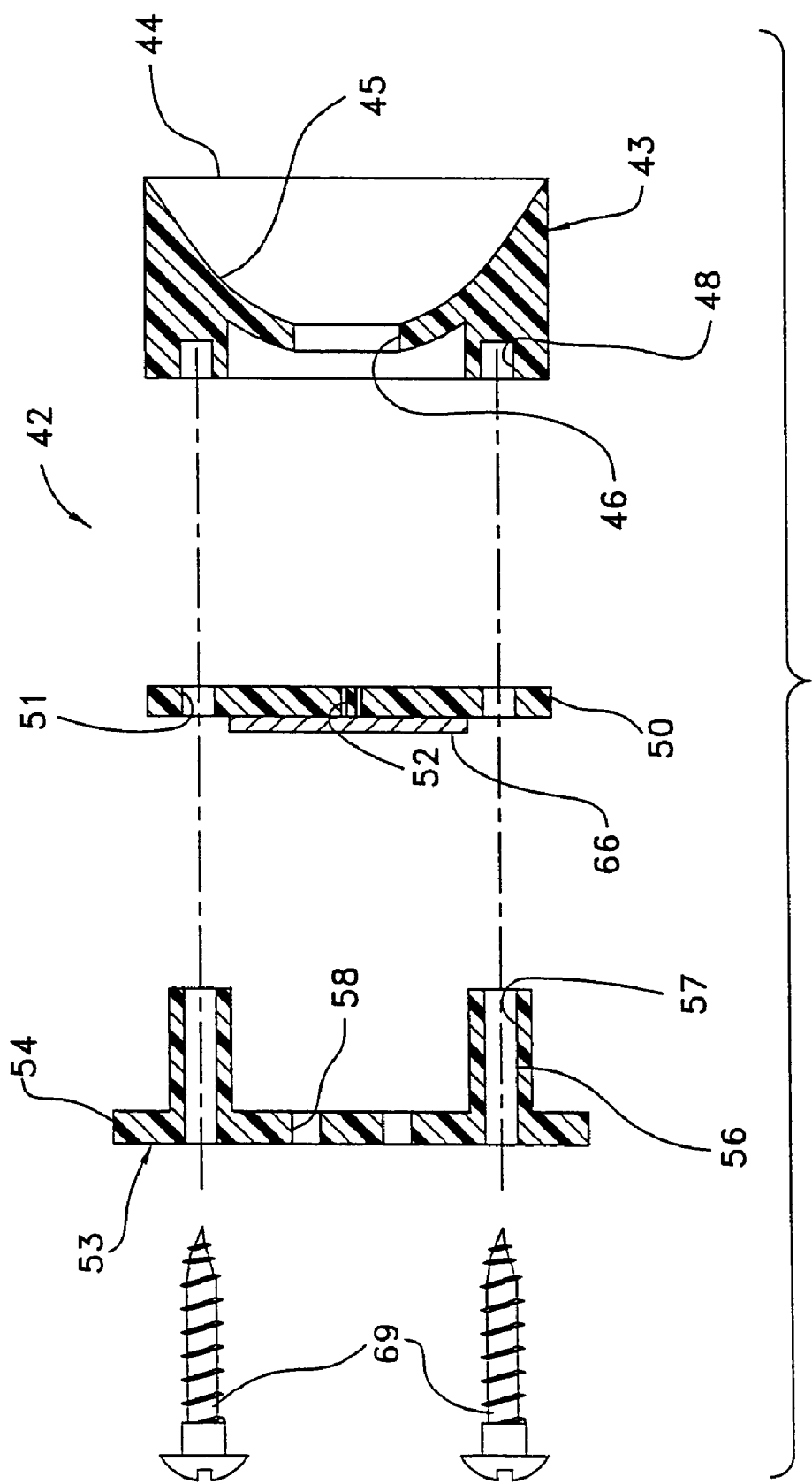

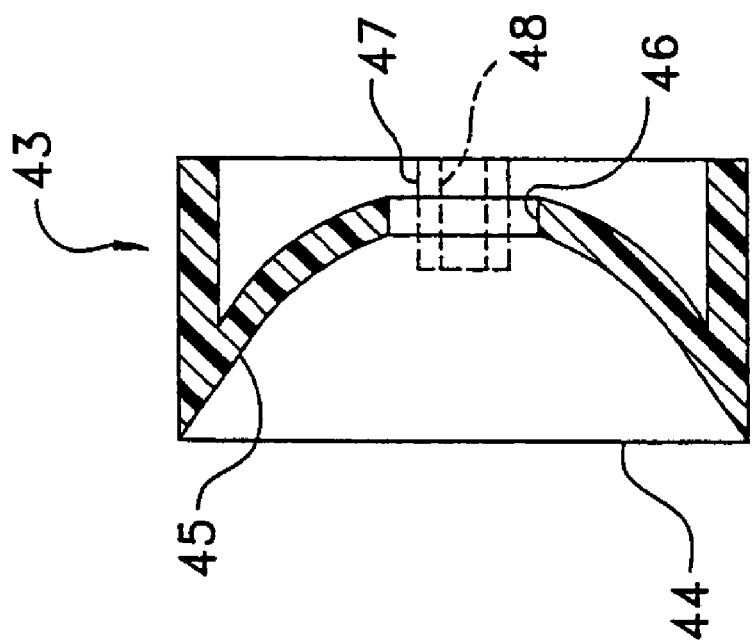
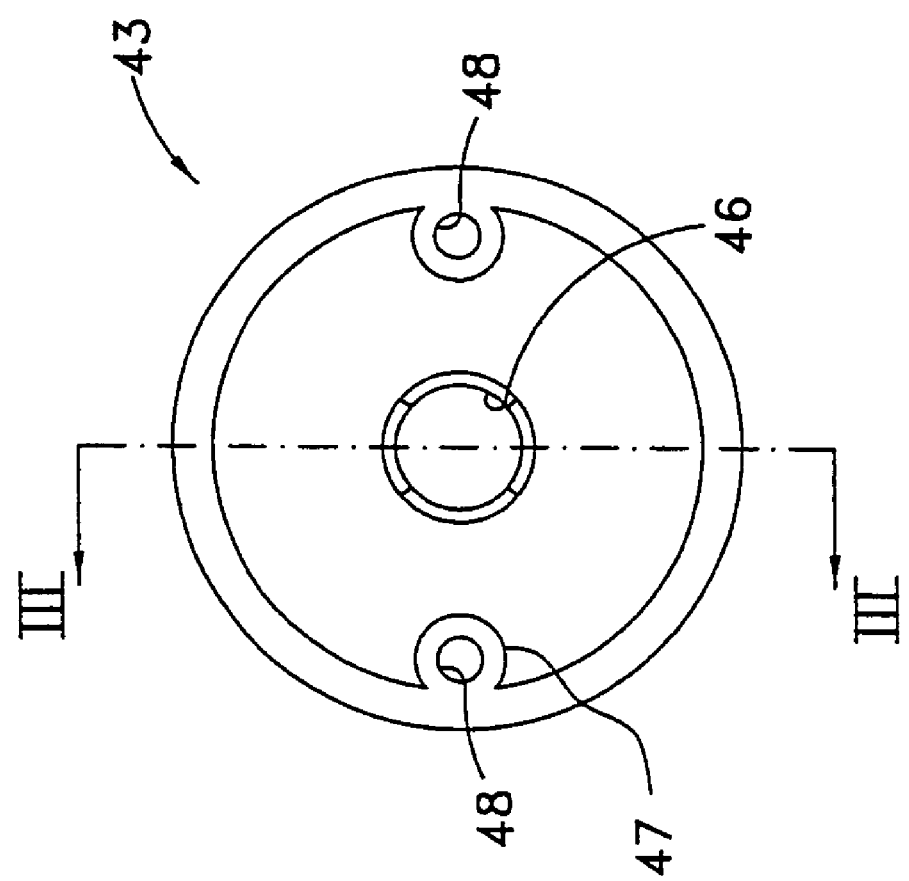
FIG. 3B
FIG. 3A

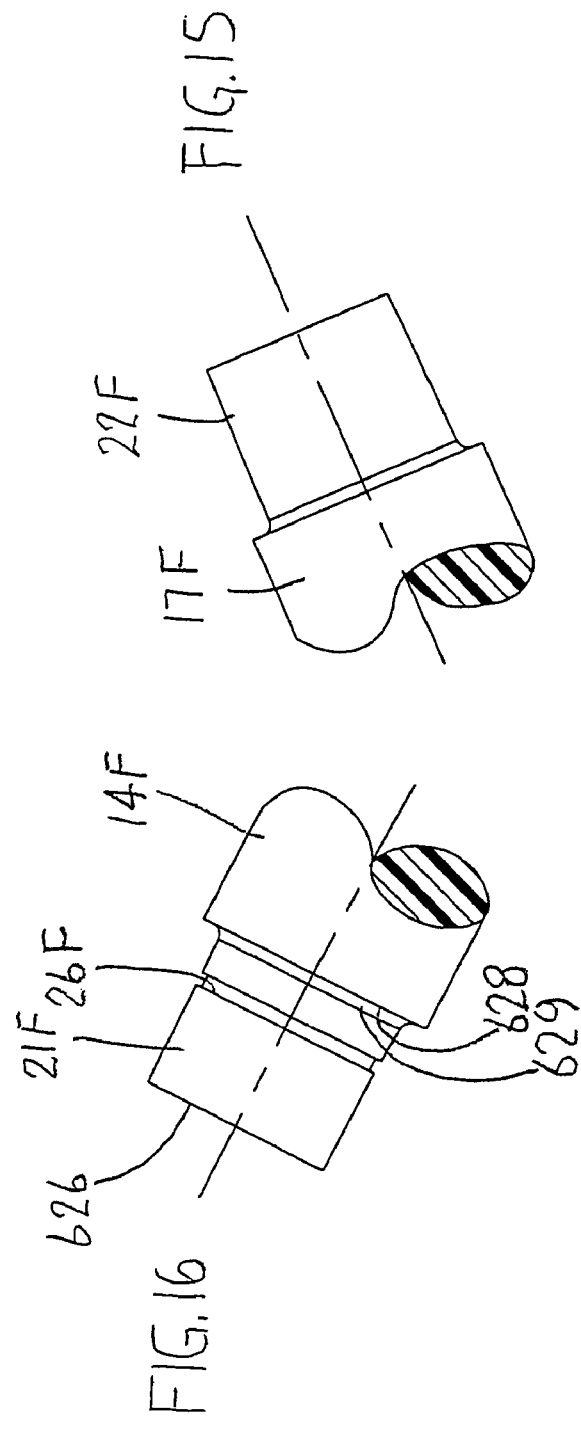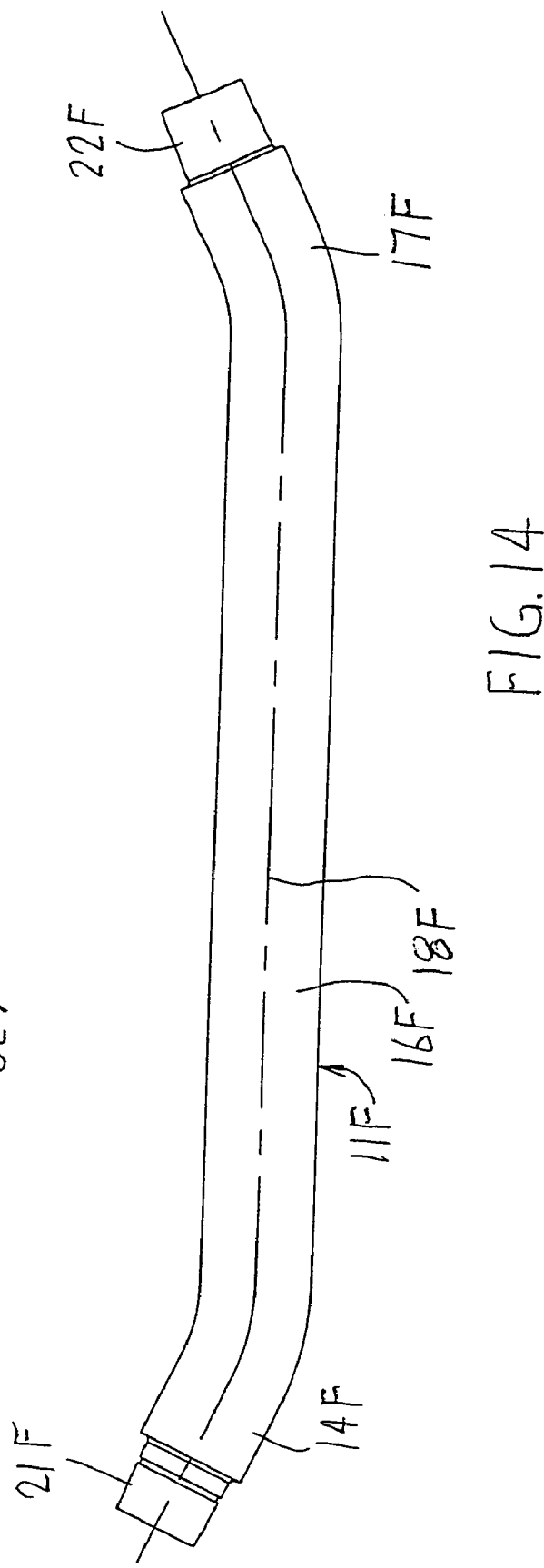

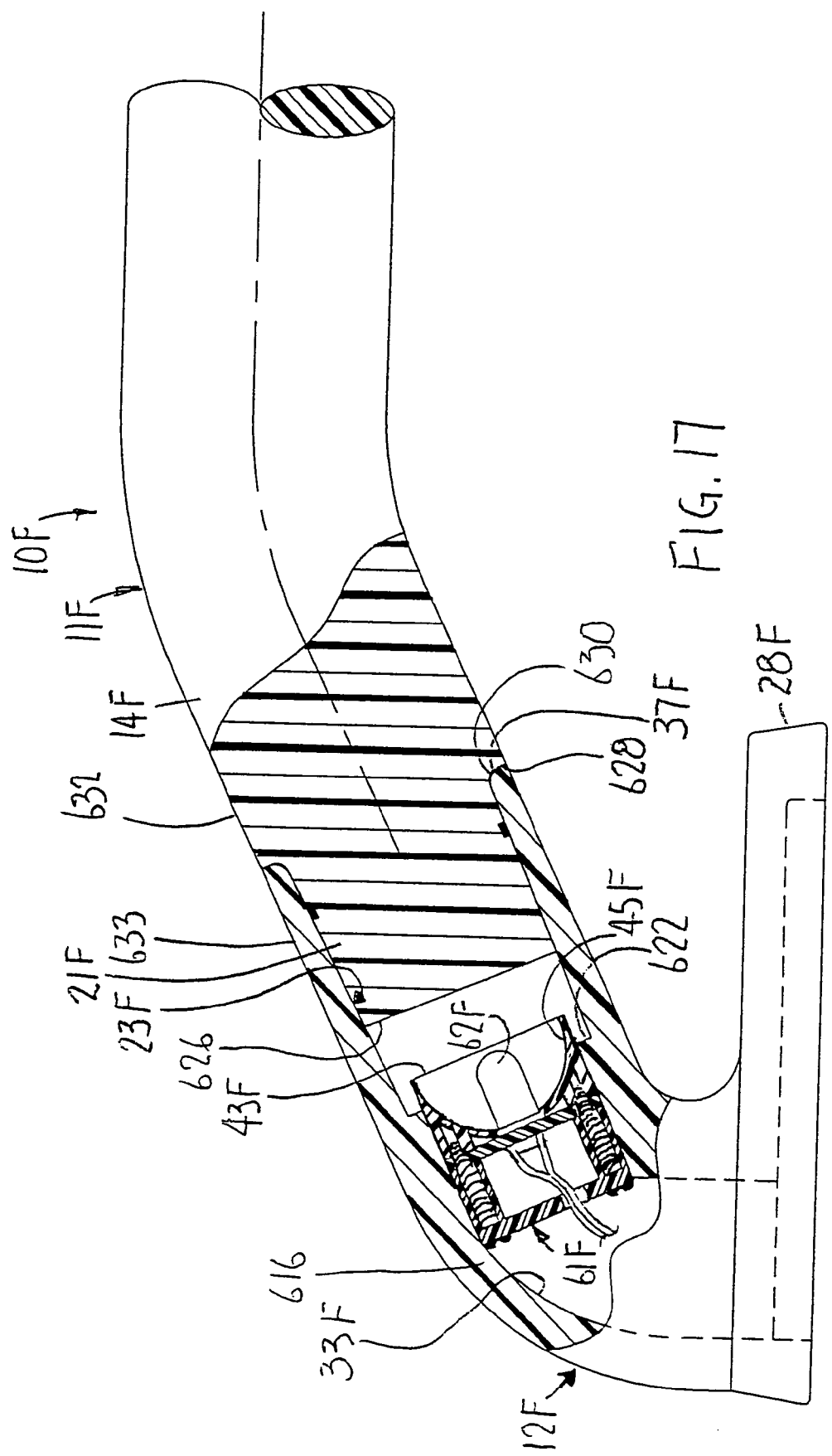

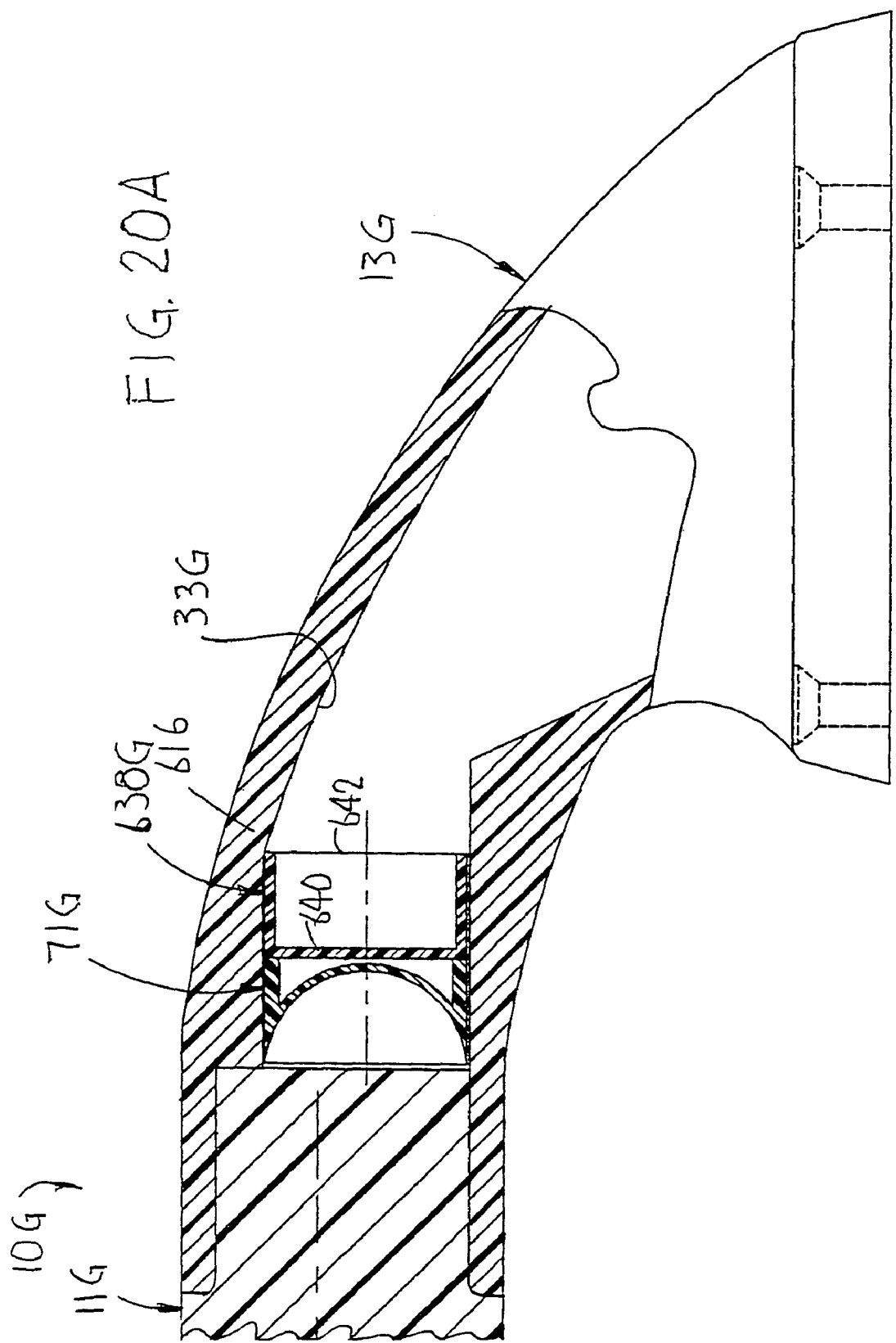

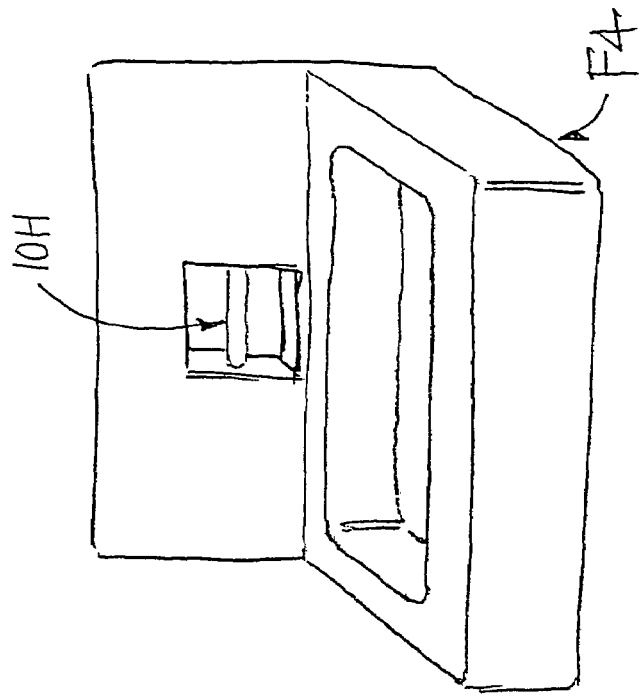
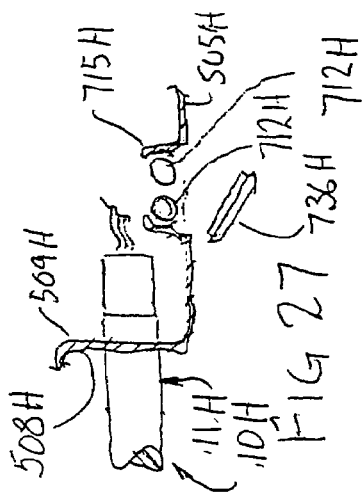
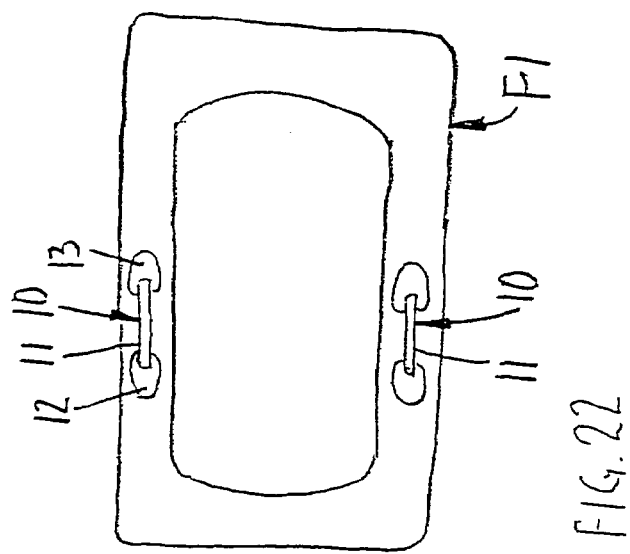

LIGHTED HANDLE

This application is a continuation-in-part of U.S. application Ser. No. 09/999,814, filed Oct. 31, 2001 now U.S. Pat. No. 6,592,240

FIELD OF THE INVENTION

This invention relates generally to handles.

BACKGROUND OF THE INVENTION

Handles have been positioned adjacent steps and along walkways for gripping by and assistance to a person moving therealong. For instance, recreational vehicles and boats have often included such handles. For example, such a handle is often located near a door of a recreational vehicle on the outside wall to aid a person stepping up into, or down from such a vehicle. In addition, such a handle may be located near the cockpit-to-cabin steps and/or along walkways in a boat to steady a person against boat movement in a seaway.

However, it is sometimes difficult for a person to easily see such a handle, which can blend in to its surroundings, and/or be hidden by twilight or the darkness of night. Such a handle can be made more visible by illumination by a nearby independent light source. However, such a light source may cause extra expense for materials and installation, and, in the case of the visual incandescent fixture, electric power use.

U.S. Pat. No. 6,135,621 of Bach, et al. (hereafter the '621 patent) discloses a handle comprising a light transmitting rod 12 carried by end brackets. A '621 patent disclosed bracket encloses an incandescent light bulb 14 which "emits light in all directions". Some of this light is emitted directly toward the adjacent end of the rod 12. A first curved mirror 18 behind the bulb 14 reflects a remaining portion of the light toward the adjacent end of the rod 12. A lens 16 located at the first end 11 of the rod 12 "reflects light in different directions". Thus, the '621 patent disclosed device is complicated by its requirement for a divergent lens 16, as well as a curved mirror, or reflector, 18. Absent the curved mirror 18, for example, most of the light emitted by the bulb 14 would radiate away from, rather than into, the light transmitting rod 12.

The objects and purposes of the present invention include improvement on prior art devices including the '621 patent device above discussed.

SUMMARY OF THE INVENTION

This invention is directed to a new and useful lighted handle. The lighted handle of this invention includes a light transmitting member having a first end portion, a second end portion and a central portion. A first end bracket carries the first end portion and a second end bracket carries the second end portion. Positioned between the light transmitting member and the first end bracket is a narrow beam light emitter, conveniently a light emitting diode (LED).

BRIEF DESCRIPTION OF THE DRAWINGS

FIG. 2B is an exploded view of the reflector of FIG. 1A;

FIG. 3A is a bottom view of the casing portion of the reflector of FIG. 1A;

FIG. 3B is a cross-sectional view of the reflector casing of FIG. 3A along the section lines III-III;

FIG. 7A is a cross-sectional view of the lighted handle of FIG. 7, along the section lines VII-VII;

FIG. 14 is an elevational view of a modified light transmitting member.

FIG. 15 is an enlarged end fragment of FIG. 14.

FIG. 16 is an enlarged further end fragment of FIG. 14.

FIG. 17 is a fragmentary, partially broken, elevational view of one end portion of a lighted handle incorporating the FIGS. 14-16 light transmitting member.

FIG. 20A is a view similar to FIG. 20 but of the opposite end portion of such lighted handle.

FIG. 22 is a schematic top view of a hot tub/spa with associated lighted handles embodying the invention.

FIG. 26 is a pictorial view of a shower stall/bath tub surround provided with a lighted handle embodying the invention.

FIG. 27 is a partially broken, schematic, top view of a battery powered lighted handle installation useable, for example, in the embodiment of FIG. 26.

DETAILED DESCRIPTION

Figure 1:
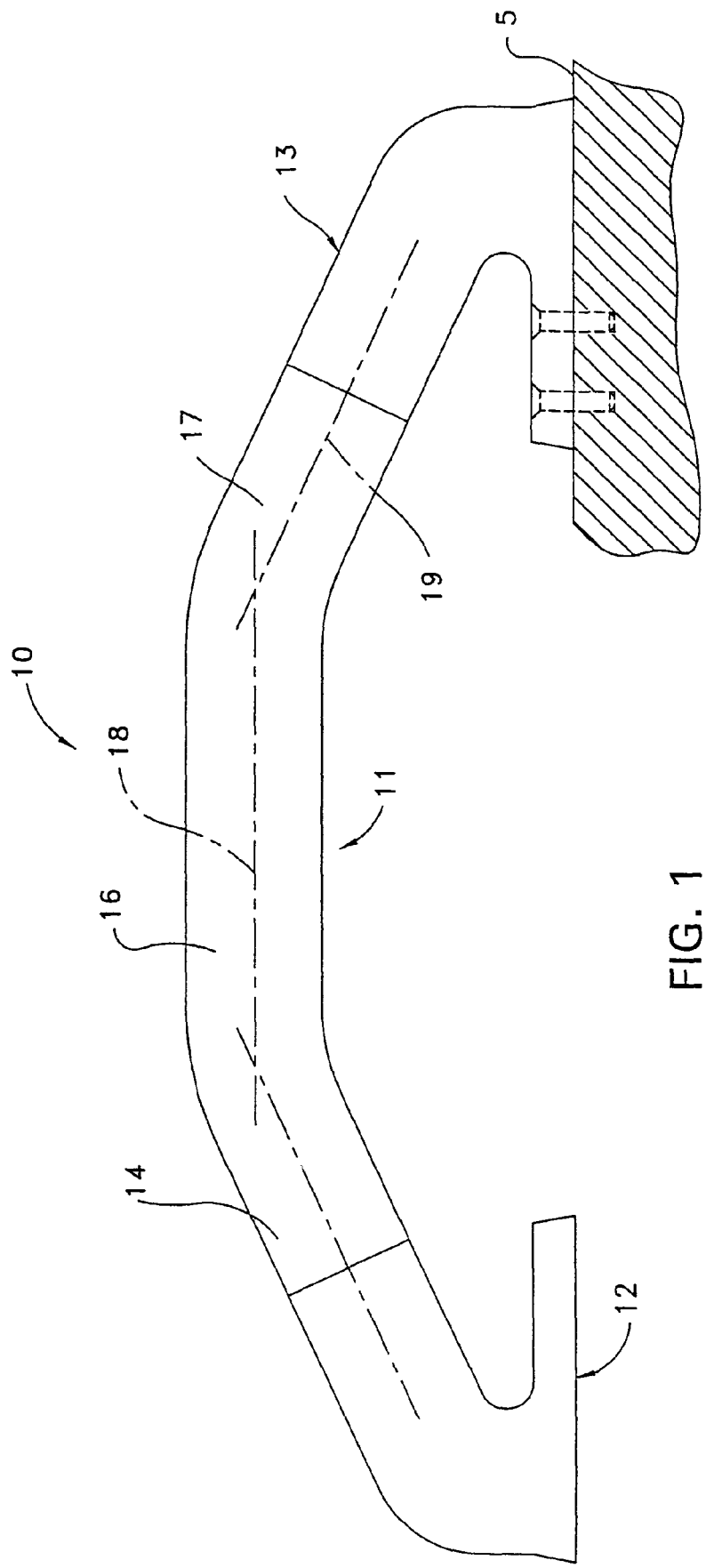
FIG. 1 is an elevational view of a lighted handle according to one embodiment of this invention.

FIG. 1 shows a lighted handle 10 according to one embodiment of the present invention. The lighted handle 10 includes a light transmitting member 11 that is fixedly carried and flanked by preferably identical end brackets 12 and 13.

The light transmitting member 11 (FIG. 1) has a first end portion 14 coupled to a second end portion 17 by a central portion 16. The light transmitting member 11 comprises a rigid, preferably transparent and preferably circular cross-section rod of suitable material, preferably an extrudable polymer, such as acrylic. The light transmitting member 11 may be straight or of any desired shape. However, and preferably, the FIG. 1 light transmitting member 11 is bent, such that the first end portion 14 and the second end portion 17 are bent away from a central portion longitudinal axis 18. Preferably, the first end portion 14 and the second end portion 17 are bent at an angle between 20 to 30 degrees, and preferably about 25 degrees, with respect to the central portion longitudinal axis 18. Thus, the light transmitting member 11 as a whole can be said to have a bent central axis 19 which includes the central longitudinal axis 18, the first end portion 14, the central portion 16 (at 18) and the second end portion 17.

Figure 1A:
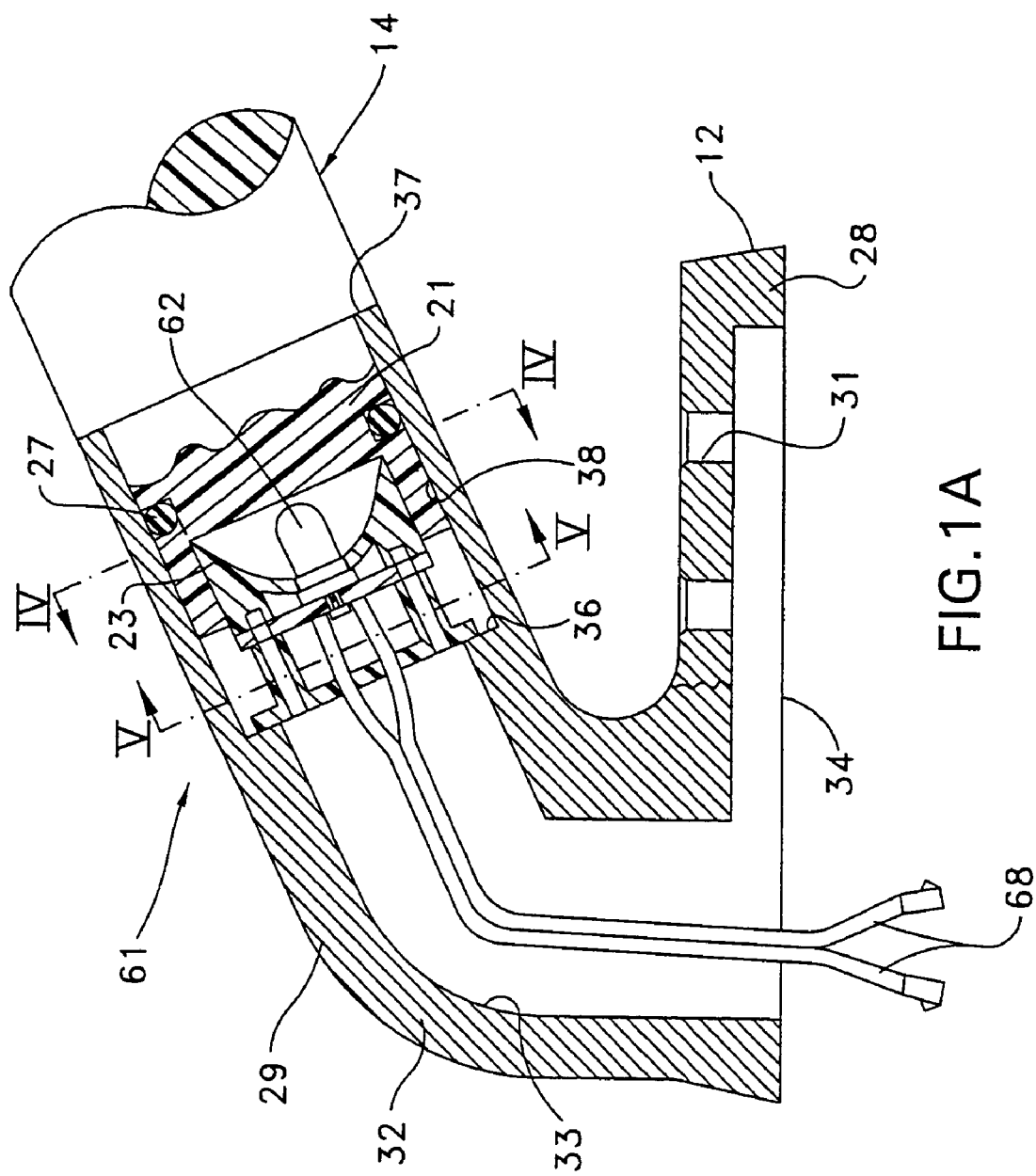
FIG. 1A is an enlarged cross-sectional view of the first end portion of the lighted handle of FIG. 1.

The end portions 14 and 17 (FIGS. 1A and 1C) of the light transmitting member 11 terminate in reduced diameter, preferably cylindrical necks 21 and 22. The necks 21 and 22 have respective end opening recesses 23 and 24 (one of which is illustrated in FIG. 2A). The necks are virtually identical, except that neck 21 has an annular groove 26 (FIG. 2A). A resilient annular seal, illustrated herein as an O-ring, 27 is snap fitted in the groove 26 (FIG. 1A).

Figure 1B:
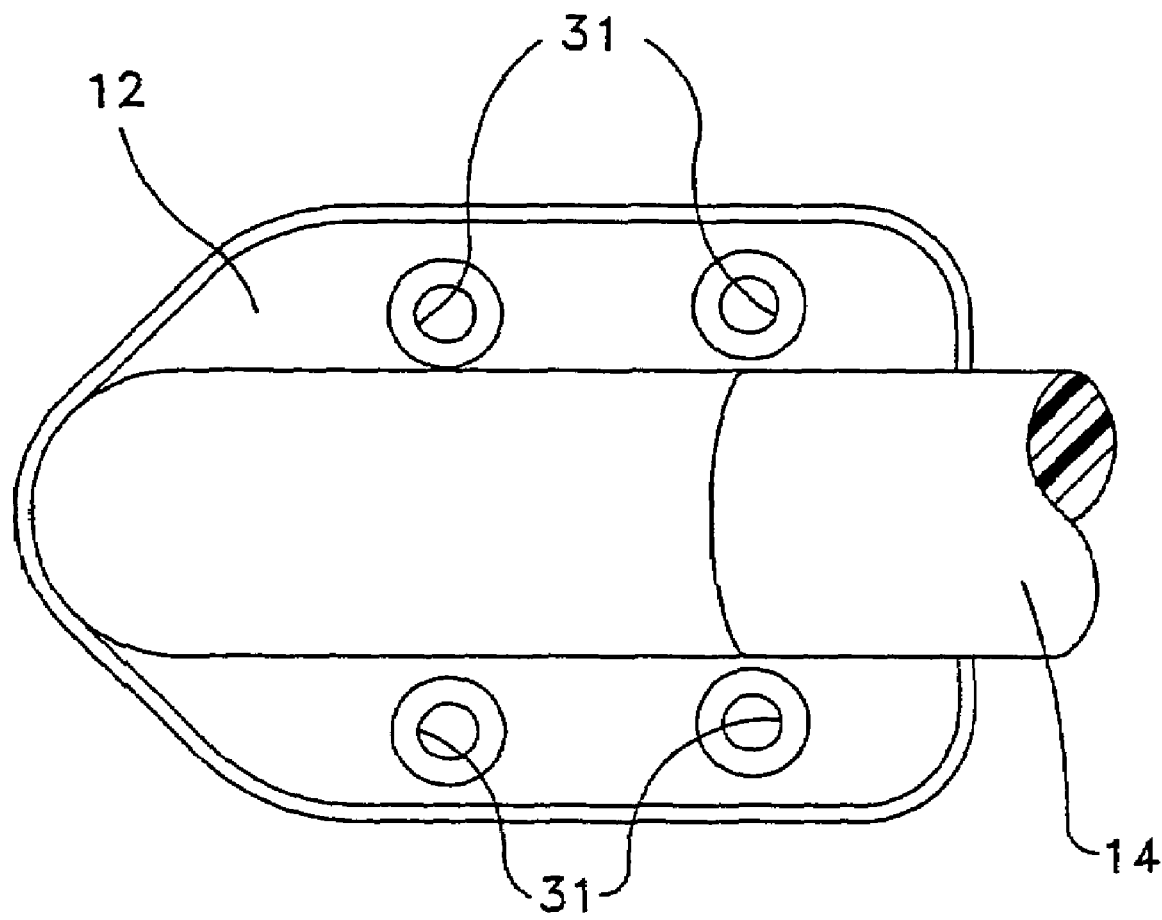
FIG. 1B is a top view of the first end portion of the lighted handle of FIG. 1.

The first end bracket 12 (FIGS. 1A and 1B) includes a mounting foot 28 and a bent hollow leg 29 fixedly upstanding therefrom. The bracket 12 is rigid and is preferably composed of a cast metal, for example aluminum, or a molded plastic. The foot 28 preferably includes mounting holes 31 for receiving fasteners (e.g. screws), to facilitate attachment of the lighted handle 10 to an existing wall or other surface at a site of use, such as the surface 5 illustrated in FIG. 1.

The hollow leg 29 (FIG. 1A) comprises an outer peripheral wall 32 which surrounds a through opening 33 continued through the foot 28 and a bottom free end 34, defining a mounting surface of the foot 28. The through opening 33 has an annular step 36 opening toward a top free end 37 of the outer wall 32 and forming a recess 38. The recess 38 is longer than, and corresponds in diameter to, the neck 21.

The second end bracket 13 is identical to the first end bracket 12 and so carries the same reference numerals, and needs no further description.

As illustrated in FIG. 2A, the handle 10 further includes a light directing insert 41 comprising a locator unit 42 and an illumination unit 61 for disposition between the bracket 12 and the light transmitting member 11 (FIG. 1A).

The locator unit 42 (FIGS. 2B, 3A and 3B) comprises a generally circularly cylindrical casing 43 closely corresponding in diameter to the light transmitting member end recess 23, for snug, coaxial reception therein. The casing 43 has a coaxially concave top end 44 facing the recess 23 and having a reflective top surface shaped to reflect a substantially non-diverging light beam and defining a reflector 45. The reflector 45 is preferably a parabolic reflector. A bore 46 extends coaxially through the casing 43. To save material, the bottom of the casing 43 is here dish-shaped in complement to the concave top end 44 to form bosses 47. Blind bores 48 extend into the bottom of the respective bosses 47.

The locator unit 42 has a central portion 50 (FIG. 2B) preferably formed as a circular disk. Extending through the central portion 50 are first outboard, preferably diametrically opposed bores 51 and second inboard bores 52.

The locator unit 42 further includes an end piece 53 (FIG. 2B). The end piece 53 comprises a disk-like base 54 of diameter intermediate the outer and inner diameters of the step 36 of the end bracket 12. Bosses 56 upstanding from the base 54 have through bores 57 aligned with the outboard bores 51 and blind bores 48. Inboard holes 58 pass through the base 54.

The illumination unit 61 (FIG. 2A) includes a light emitter 62 that snugly extends through the bore 46 coaxially of the reflector 45 and has a base flange 63 that seats against the bottom of the casing 43. The light emitter 62 is preferably a light emitting diode (LED) that advantageously emits a relatively narrow light beam, and does not waste electric energy in emitting light in undesired other directions, an energy efficiency which is particularly desirable when using a vehicle battery as the energy supply. The light emitter 62 here generates white light, though colored light emitters may be used.

Figure 5:
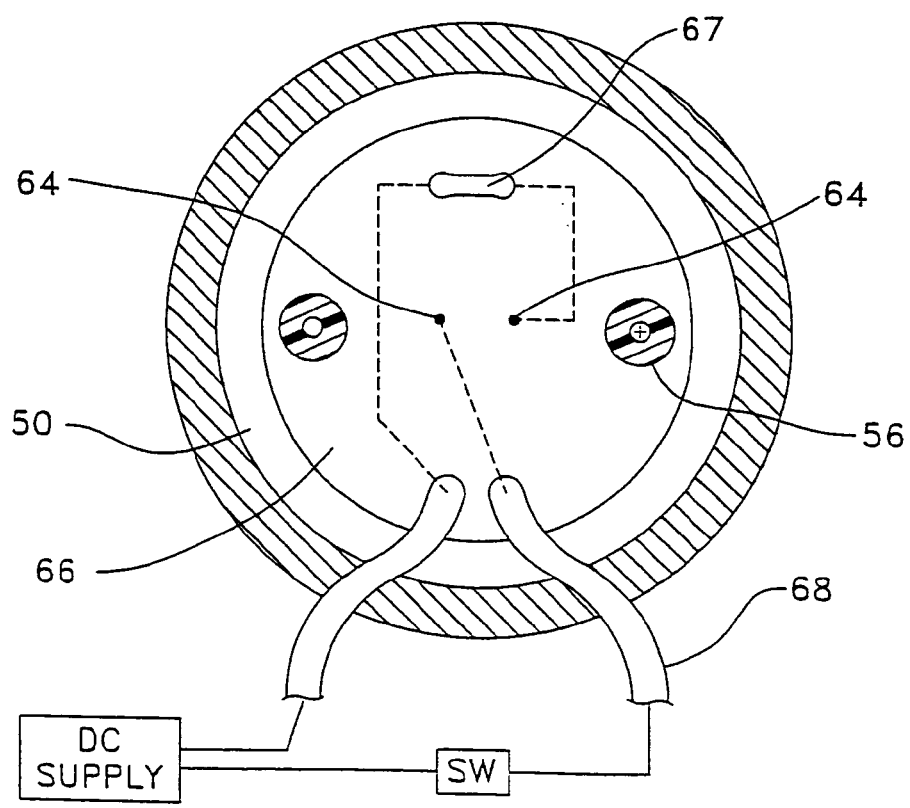
FIG. 5 is a cross-sectional view of the first end portion of the lighted handle of FIG. 1A, along the section lines V-V.

The illumination assembly 61 further includes flat printed circuit board 66 fixed to the underside of the disk 50 (FIGS. 2B and 5). The light emitter 62 has two side-by-side spaced electrical supply conductors 64 (FIG. 5) extending from the base thereof through the disk holes 52 (FIG. 2A) and aligned extensions of those holes through the printed circuit board 66. A load resistor 67 is fixed at the underside of the printed circuit board 66. Insulated wires 68 extend into the bottom of the bracket 12, up through the base holes 58 (FIG. 2A) and to the printed circuit board 66. Printed circuit board conductors, schematically illustrated by dotted lines in FIG. 5, electrically connect the supply conductors 64 of the light emitter 62 and resistor 67 in series with the wires 68.

The casing 43, central portion (disk) 50 and end piece 53 of the locator unit 42 are coaxially stacked and are pressed together by suitable fasteners, such as screws 69, inserted through aligned sets of the bores 48, 51 and 57, to assemble the light directing insert 41 with the disk 50 pressing the LED 62 up against the bottom of the casing 43.

The handle 10 (FIG. 1C) further includes a light deflecting unit 71 for disposition between the bracket 13 and the light transmitting member 11. The light deflecting unit 71 preferably is merely a casing 72 similar to the casing 43 above described but without the central bore 46 of the latter. The casing 72 has a coaxially concave top end facing the recess 24 and having a reflective top surface shaped to reflect a substantially non-diverging light beam and defining a reflector 73, preferably similar to the reflector 45. Note that the light deflecting unit 71 includes no light emitter assembly.

To assemble lighted handle 10, the light directing insert 41, which is assembled as described above, and the light deflecting unit 71 are seated in the respective recesses 23 and 24 in the respective necks 21 and 22 of the light transmitting member 11. The insert 41 is preferably removable in the unlikely event that the LED 62 requires replacement. However, it may be convenient to permanently fix the unit 71 in the neck recess 24 as by an adhesive or other suitable means.

The reduced diameter neck 21 (FIG. 1A), including the insert 41, is inserted into the recess 38 of the first end bracket 12. The step 36 is positioned sufficiently below the top surface 37 to allow the entire reduced diameter neck 21 of the first end portion 14 and the insert 41 to be contained within the recess 38. In addition, the combined length of the casing 43, the central portion 50 and the end piece 53 is such that when the first end portion 14 of the handle 10 is assembled, the casing 43 is positioned snugly within the recess 23 of the neck 21 while the end piece 53 rests on the step 36. The O-ring 27 is appropriately sized and positioned to create a seal between the first end portion 14 and the first end bracket 12. With the insert 41 and the neck 21 so received in the first end bracket 12, the reflector 45 and the LED 62 are coaxial with the first end portion 14 of the light transmitting member 11 and the tube axis 19 is coaxial with a length axis 65 of the light emitter 62.

When the first end portion 14 of the member 11 (FIG. 1A) is seated in the first end bracket 12, the wires 68 extend through the hollow leg 29 of the bracket 12 and out the free (bottom) end 34 thereof.

Unlike in first end bracket 12, there is no light emitter in the second end bracket 13 in the FIGS. 1-5 embodiment. Therefore, the light transmitting member reduced diameter neck 22 can, if desired, be attached to the second end bracket 13 in a permanent manner. However, an O-ring seal, similar to the O-ring 27, could instead be utilized to frictionally secure the reduced diameter neck 22 to the second end bracket 13.

The thus assembled handle 10 can then be fixed as by screws (not shown) to a desired surface, schematically indicated at 5 in FIG. 1, with the wires 68 typically led through a hole, not shown, in surface 5, e.g. to connect the light emitter conductors 64 (FIG. 5) and load resistor 67 in series to a power supply, such as a conventional electrical power supply (e.g. a 12-volt vehicle battery), or other DC power source, preferably through a manual switch and/or an ambient light sensing switch, SW or to an AC/DC converter connected to a suitable AC supply, such as a conventional 110-volt AC outlet.

Operation

The light emitter 62 (FIG. 1A), when activated, emits a beam of light into the adjacent end 21 of the light transmitting member 11 away from the reflector 45. The light transmitting member 11 transmits the light beam through its length to the remote reflector 73, which reflects the light beam back to the reflector 45. The light beam is thus continuously reflected back and forth through the light transmitting member 11. Light within the light transmitting member 11 illuminates its peripheral surface such that the light transmitting member 11 is easy to see in poorly lit areas.

Since the reflector 45 blocks light escape behind the light emitter 32 and the reflector 73 blocks light escape from the second end portion 17 of the light transmitting member 11, little light leaks from or is absorbed by the brackets, and is thus lost.

Modification

Figure 6:
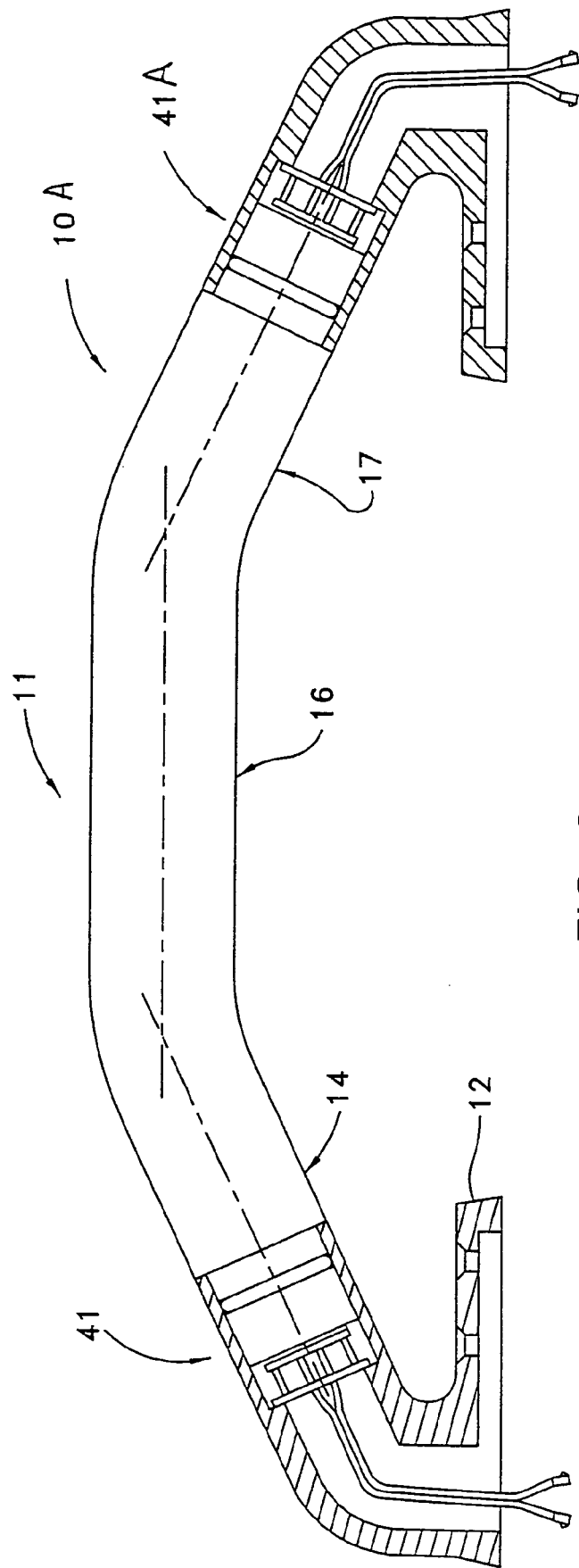
FIG. 6 is a front view of a lighted handle according to a second embodiment of this invention.

FIG. 6 shows a modified lighted handle 10A. The modified handle 10A corresponds to the previously described handle 10, except as described hereafter. Parts of the handle 10A that correspond to parts of the handle 10 carry the same reference numerals with the suffix "A" added thereto.

The handle 10A preferably substitutes, for the light deflecting unit 71 in the rightward part of the handle 10, a duplicate 41A of the insert 41. Thus, the lighted handle 10A includes preferably identical first and second inserts 41 and 41A at opposite ends thereof.

Further Modification

Figure 7:
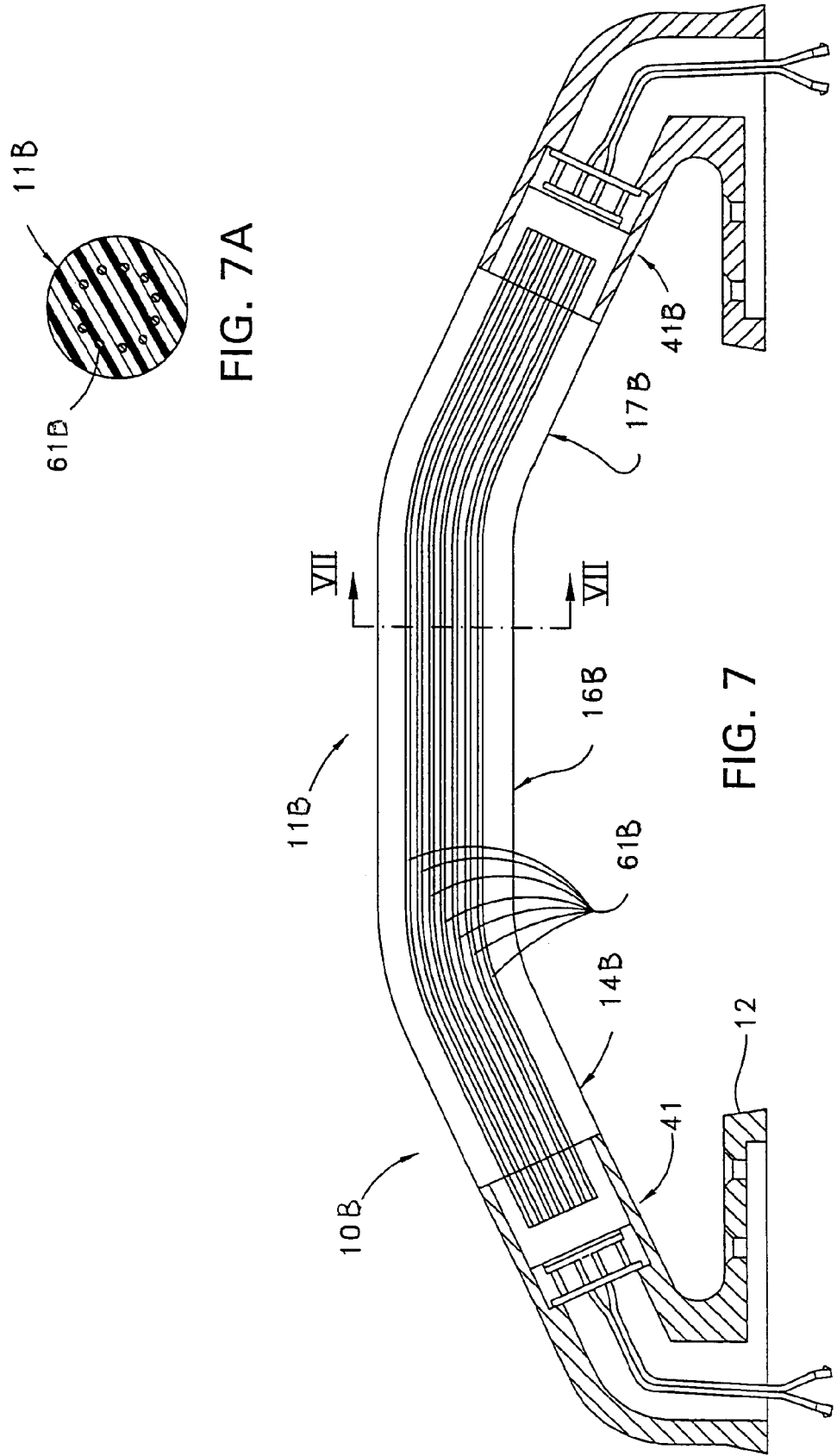
FIG. 7 is a front view of a lighted handle according to a third embodiment of this invention.

FIG. 7 shows a further modified lighted handle 10B. The handle 10B corresponds to the previously described handles, except as described hereafter. Parts of the handle 10B that correspond to previously described parts of the handles 10 and 10A carry the same reference numerals with the suffix "B" added thereto. The lighted handle 10B includes one or both of the preferably identical first and second illumination inserts 41 and 41A at opposite ends thereof.

The handle 10B (FIGS. 7 and 7A) has a number of visible stripes 261 co-extruded lengthwise along and within the light transmitting member 11B. The stripes 261 can, for example, be composed of a reflective substance, such as a reflective paint, to radially outwardly reflect the light emitted from an insert 41 and/or 41A. Alternatively, the stripes 261 could be composed of a non-reflective, opaque substance. Here, the stripes 261 would block light from being axially transmitted in parts of the cross-section of the light transmitting member 11B. The resulting light emitting and dark zones alternating across the side of the handle could make the handle 10B easier to detect by users, such as those with impaired depth perception.

Further Modification

Figure 8:
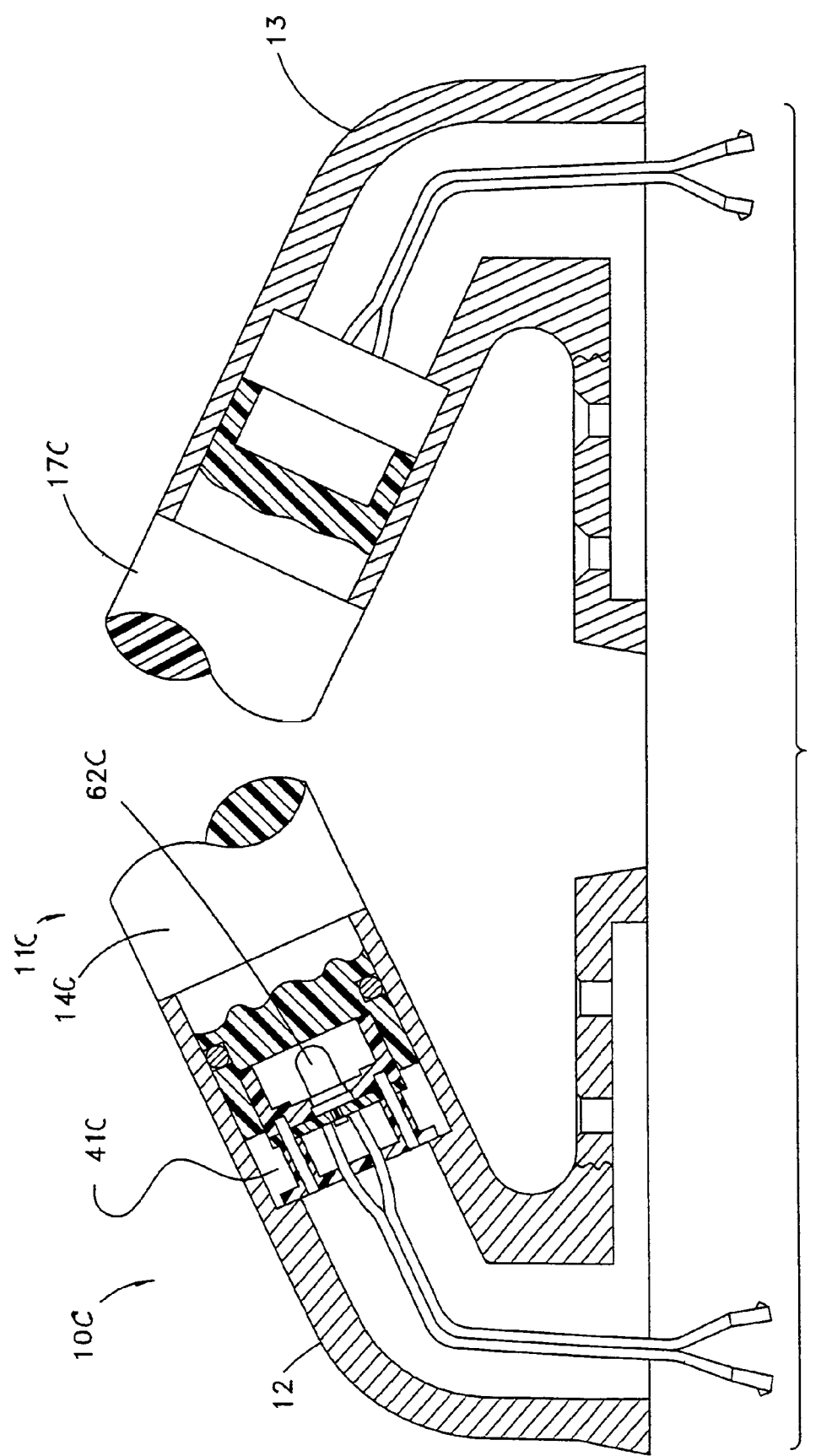
FIG. 8 is an enlarged, fragmentary, central cross sectional view of a simplified embodiment of the invention which eliminates the reflectors of the FIGS. 1-7 embodiments.

FIG. 8 discloses a simplified handle 10C similar to those disclosed above with respect to FIGS. 1-6, except as follows. Parts of the handle 10C corresponding to parts of above described handle carry the same reference numerals with the suffice "C" added.

The FIG. 8 handle 10C advantageously eliminates the FIGS. 1-6 reflectors 45 and 73 at the opposite ends of the light transmitting member 11. Moreover, little light energy is lost as a result, because the light emitter 62 is preferably a light emitting diode (LED). More particularly, the usual characteristic of a typical LED is light emission, not in all directions like an incandescent bulb, but rather in a narrow beam. Beam divergence is typically small, for example, between 5°-25° and usually around 15°. The LED 62 has its light beam directed coaxially along the light transmitting member 11 and directly toward its opposite end. The amount of light emitted by the LED in other directions is typically negligible. Thus, the backing reflector 45 in FIG. 2A would have relatively little light to reflect into the light transmitting bar 11 and while such reflector may somewhat improve the efficiency of illumination of the member 11, in practice the improvement may be small enough to be difficult to notice.

Figure 11:
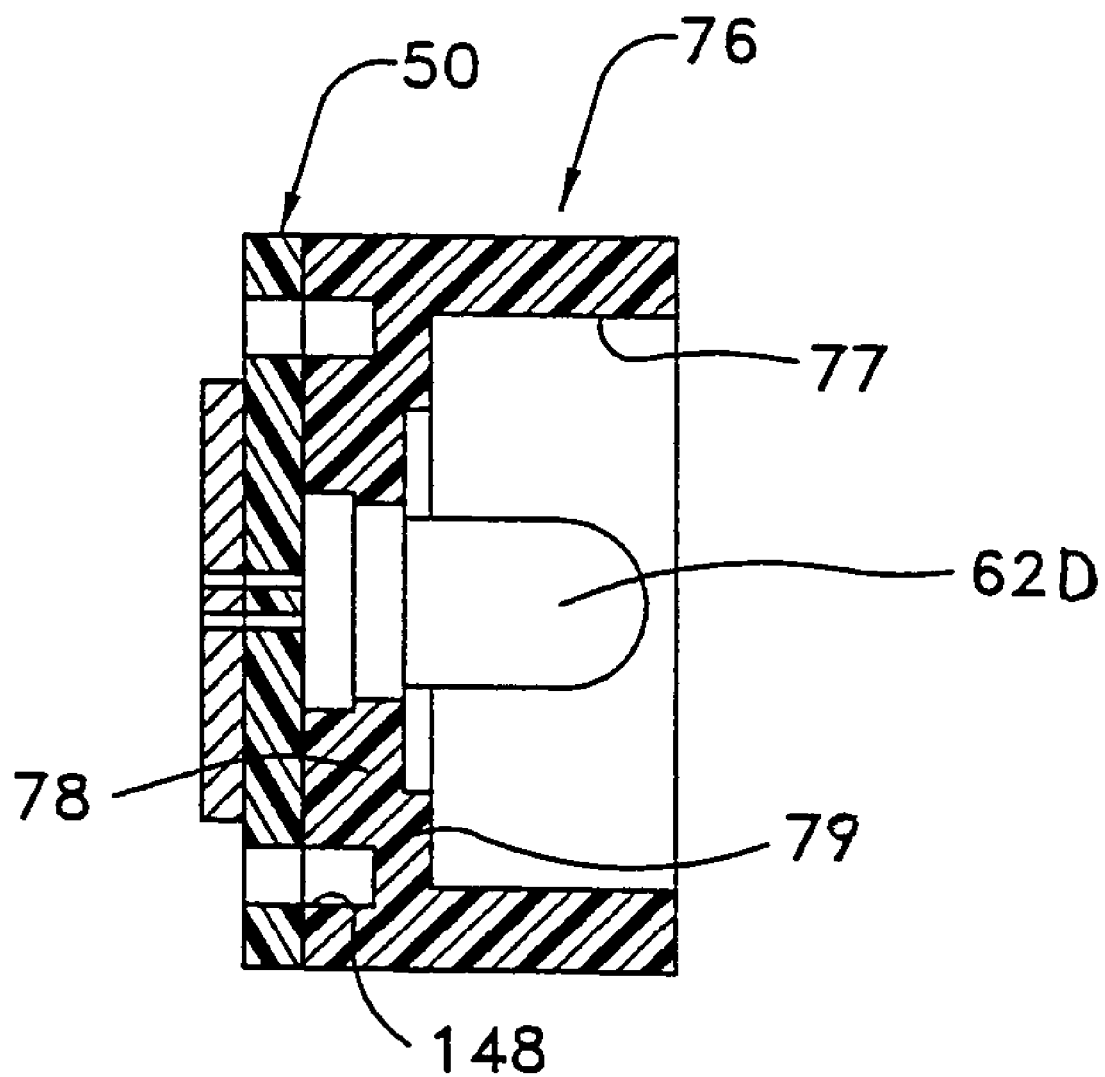
FIG. 11 is an enlarged fragment of FIG. 8.

In FIG. 8, a light directing insert 41C including the LED 62C is mounted at one (if desired) or both ends (as shown) of the light transmitting member 11C, with the FIGS. 2-7 casings 43 (with their reflectors 45) substituted each by a casing 76 (FIG. 11) simplified by substituting, for the precisely formed reflector 45, a non-critically shaped and dimensionally generally cup shaped recess 77. The bottom 78 of the casing 76 is thickened at 79 to accommodate the blind bores 48C. The thickened portions 79 may be annular as shown or in the form of circumferentially spaced bosses, if desired.

Figure 1C:
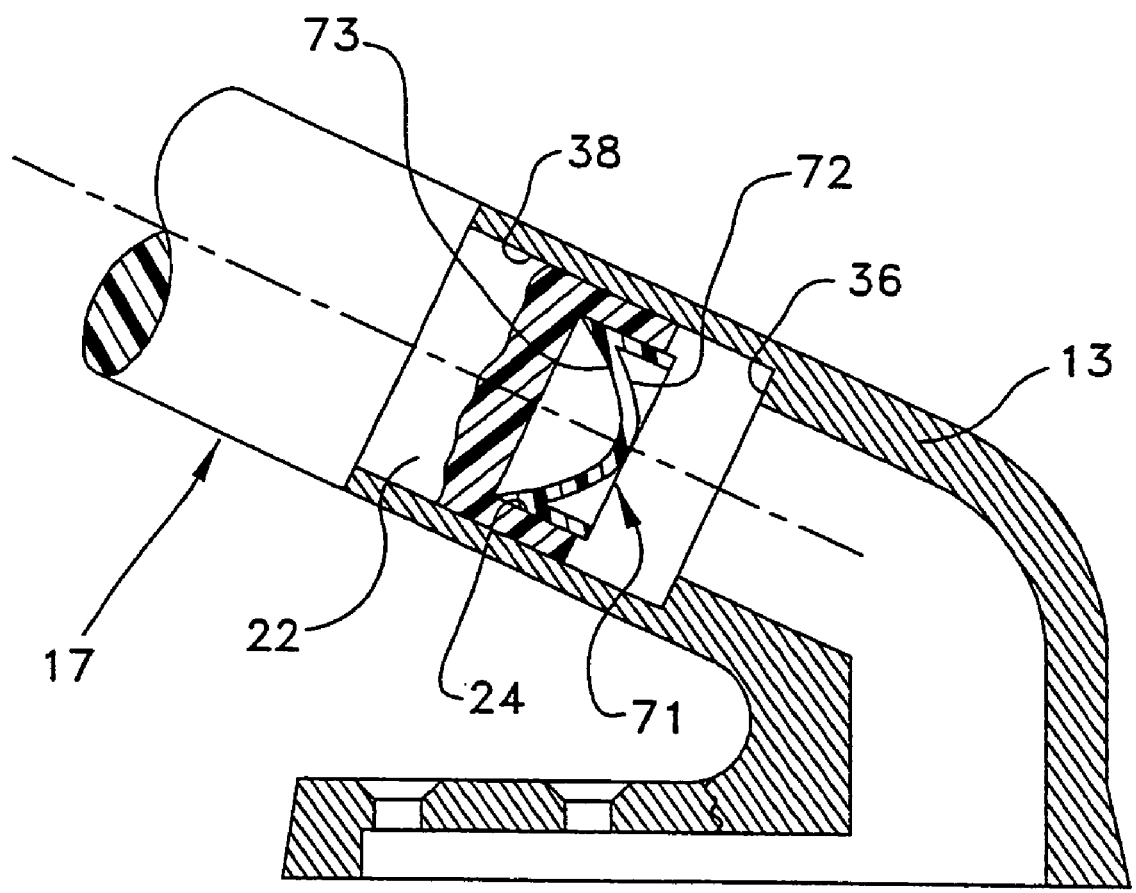
FIG. 1C is an enlarged cross-sectional view of the second end portion of the lighted handle of FIG. 1.
Figure 2A:
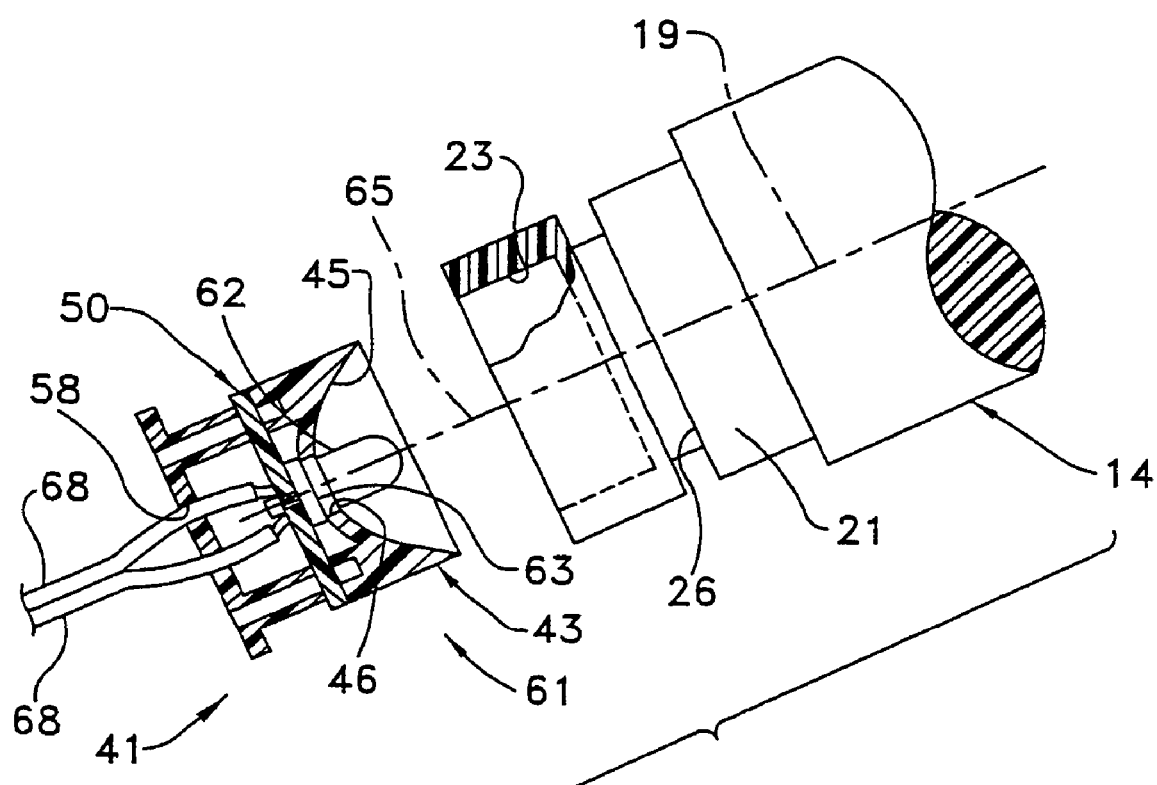
FIG. 2A is an exploded view of the first end portion of the lighted handle of FIG. 1A without the bracket.
Figure 4:
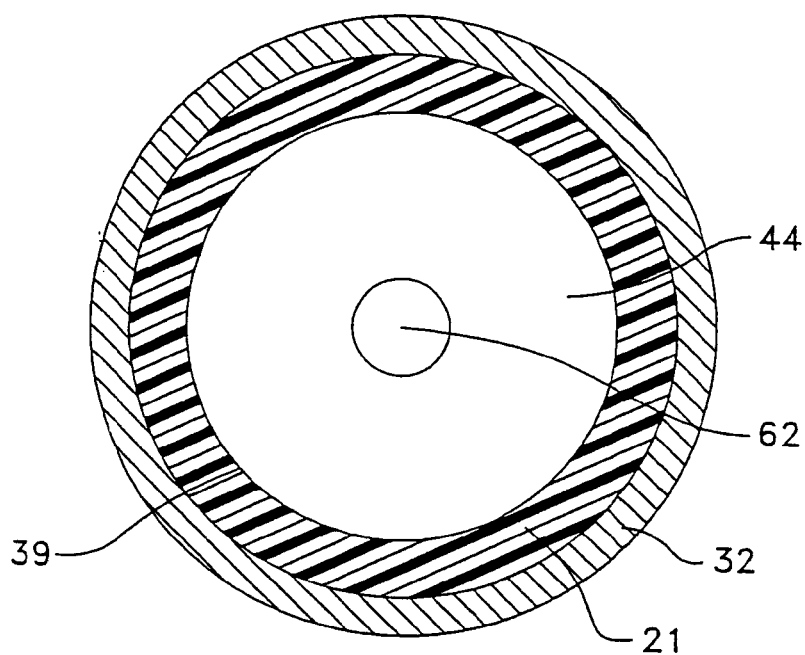
FIG. 4 is a cross-sectional view of the first end portion of the lighted handle of FIG. 1A, along the section lines IV-IV.

The reflector 45 at the opposite end of the light transmitting member 11 (the end without an LED) in FIG. 1C can be retained in the handle 10C, or as shown in FIG. 8, eliminated. The latter may cause the brightness of the member 11 in FIG. 8 to be somewhat, but not greatly, diminished. That could be regarded as a fair tradeoff for the structural simplification and cost reduction achieved by the elimination of the reflector.

Figure 9:
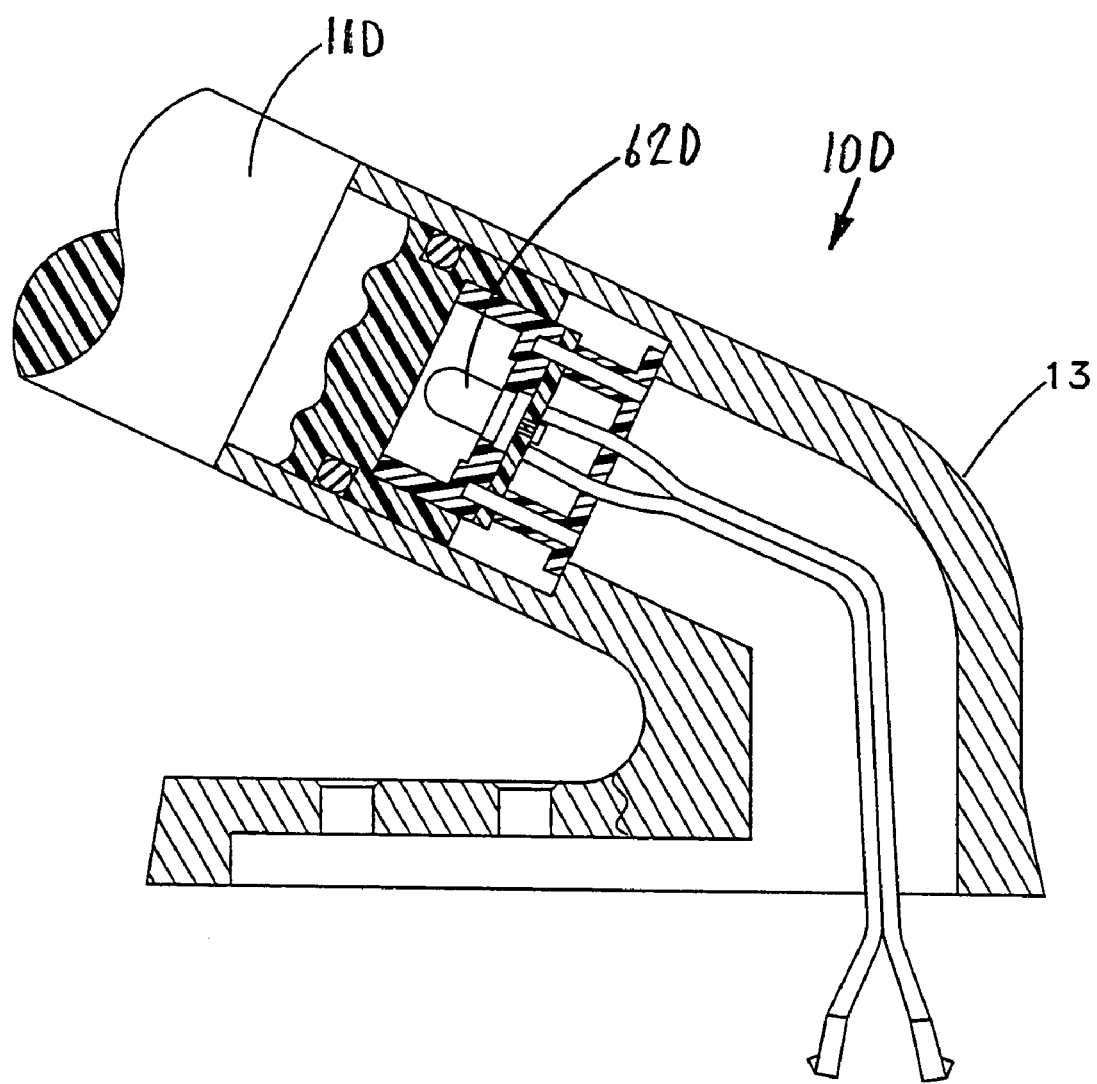
FIG. 9 is a fragment of FIG. 8 modified to show a second light source at a second end portion of the light transmitting member.
Figure 10:
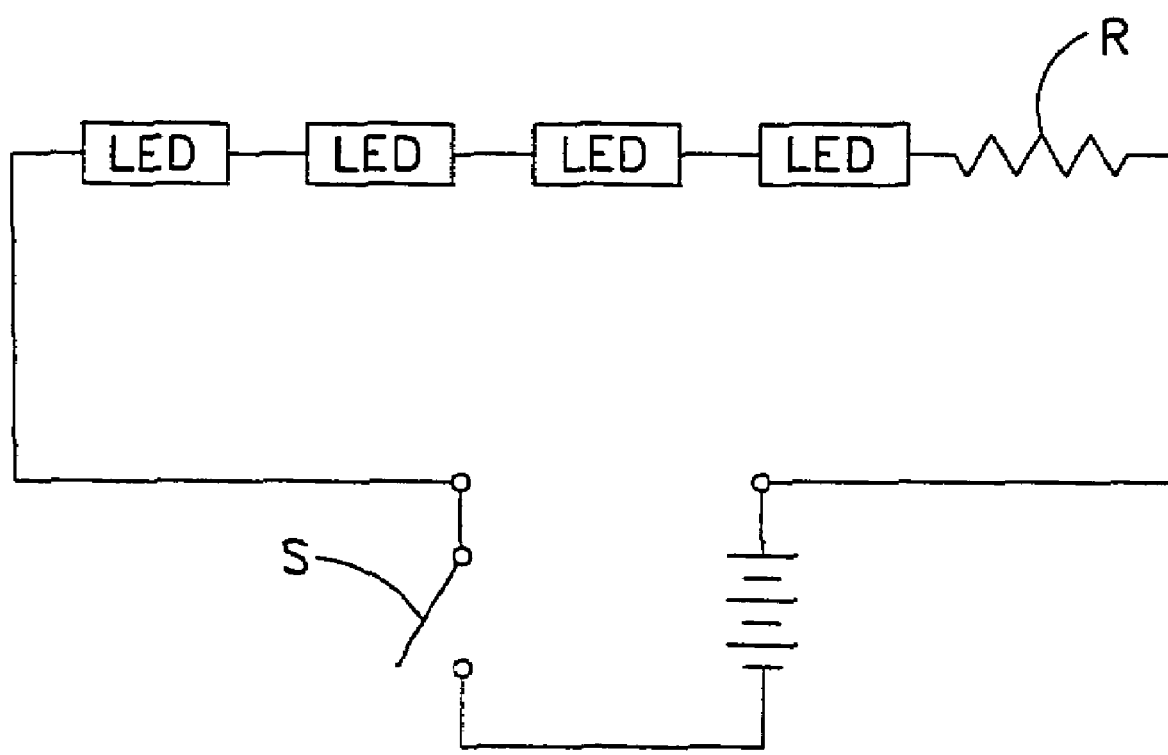
FIG. 10 is a schematic circuit diagram.

Applicant's FIG. 9 handle 10D is similar to the FIG. 8 handle 10C except as follows. In FIG. 9 parts of the handle 10D corresponding to parts of above described handle carry the same reference numerals with the suffice "D". In FIG. 9, a second LED 62D at the opposite end of the light transmitting member 11D. The FIG. 9 handle 10D is thus free of reflectors at both ends of the light transmitting member 11D. Thus, compared to FIG. 1-7, this embodiment reduces parts, assembly, and inventory costs. On the other hand, this embodiment, by providing LEDs 62D at respective ends of the light transmitting member 11D increases the brightness of the illuminated light transmitting member 11. The second LED 62D at the second end of the light transmitting member 11D applies more light to the second end portion of the light transmitting member 11D than would a mirror, or reflector, by itself. Also, due to the narrowness of the output beam of a typical LED, virtually all of the light emitted by the second LED 62D is in a narrow beam less wide than, and substantially coaxial with, the opposed second end portion of the light transmitting member 11D. Light output from such LED 62D in other directions is small enough that redirection by a reflector into the second end portion of the light transmitting member 11 would likely not be noticed.

While the opposed reflectors of the light directing inserts 41 and 41A in the FIG. 6 embodiment reflect some of the light from the respective remote LEDs light losses along the member 11A and at the reflector of each light directing insert 41 and 41A would tend to mask any loss of light frame emitting member 11A brightness caused by eliminating such reflectors.

Further Modification

Figure 12:
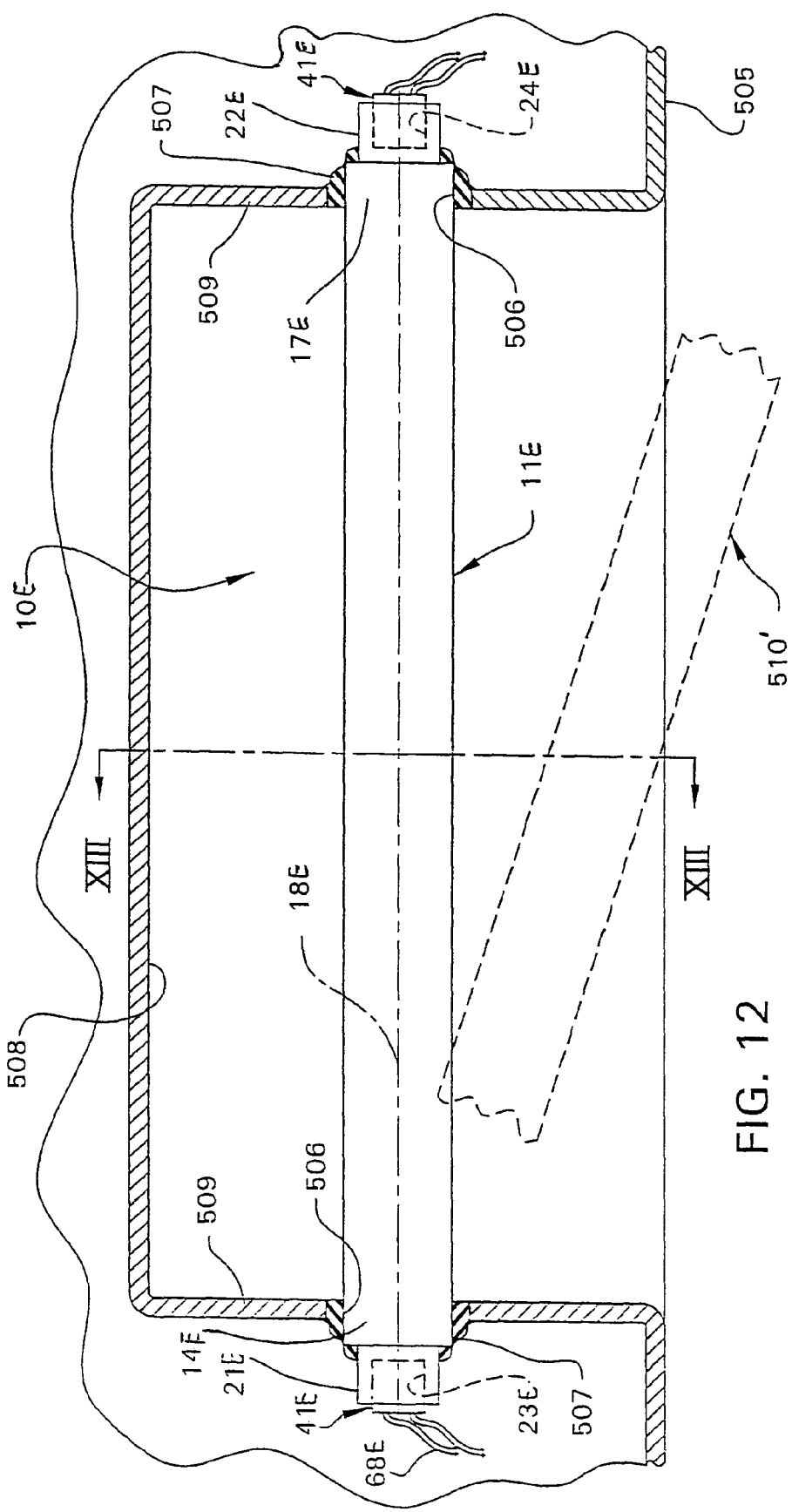
FIG. 12 is a front view of a lighted handle according to yet another embodiment of this invention.
Figure 13:
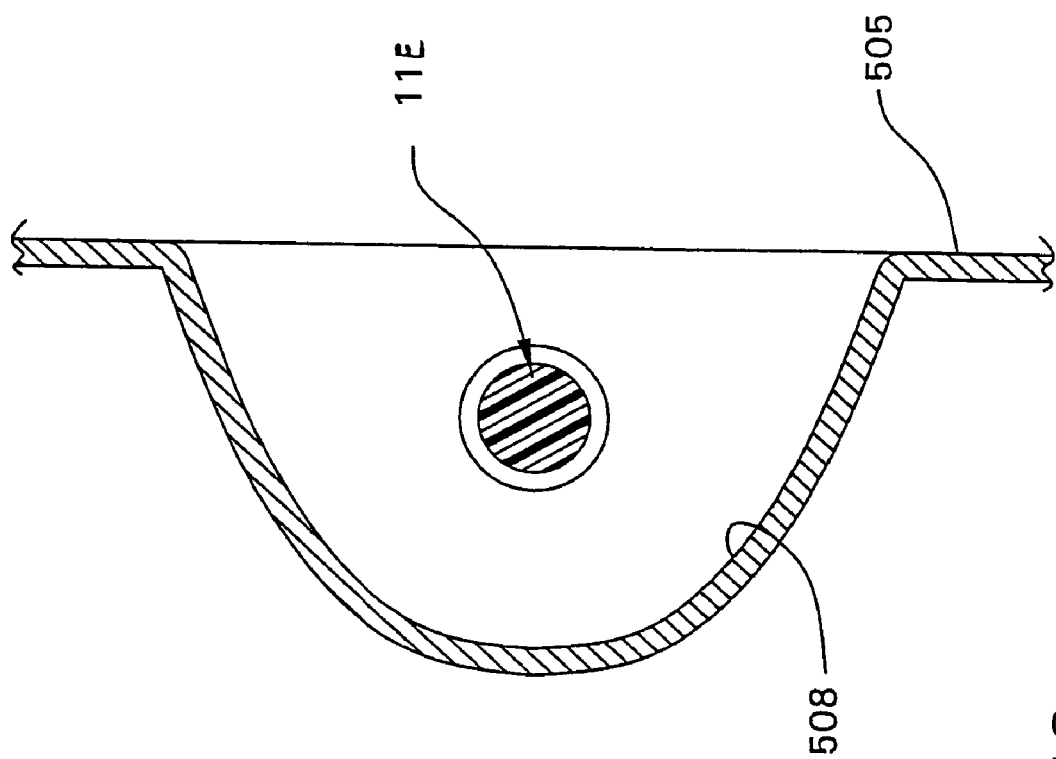
FIG. 13 is a cross-sectional view taken substantially on the line XIII-XIII of FIG. 12.

A further modified lighted handle 10E is illustrated in FIGS. 12 and 13. Components of the handle 10E that correspond to components of previously described handles carry the same reference numerals with the suffix "E" added.

The lighted handle 10E includes a solid light transmitting member 11E (FIG. 12) that has first and second end portions 14E and 17E. The light transmitting member 11E is preferably straight. In other words, its first and second end portions 14E and 17E are coaxial with the longitudinal axis 18E of the central portion 16E of the light transmitting member 11E.

The end portions 14E and 17E (FIG. 12) terminate in reduced diameter, preferably cylindrical necks 21E and 22E preferably similar to the necks 21 and 22 of FIGS. 1A and 1C, respectively, and thus include respective end opening recesses 23E and 24E. It will be understood that such end opening recesses 23E and 24E in the FIG. 12 embodiment, are preferably coaxial with the longitudinal axis 18E of the light transmitting member 511.

Mounted in each recess 23E and 24E is a light directing insert 41E (FIG. 12), preferably similar to one of the light directing inserts 41 and 41E of FIGS. 2A and 8, respectively, but preferably omitting the end piece 53 (FIG. 2B). Thus, each insert 41E preferably includes either a reflective casing (like that at 43 in FIG. 2A) or a non-reflective casing (like that at 76 in FIG. 8).

The inserts 41E (FIG. 12) are fixed in the respective recesses 23E and 24E by any convenient means, e.g. removably as in FIG. 1A or substantially permanently, as by an adhesive means. In either case, the inserts 41E are fixed in alignment with the light transmitting member 11E. If desired, a suitable end cap, or other device, not shown, could be removably fixed to each end of the light transmitting member 11E to removably fix the inserts 41E thereto and thus allow ready repair.

The FIG. 12 lighted handle 10E omits the mounting brackets of the lighted handles of the FIGS. 1-11 embodiments. Instead, the lighted handle 10E is here recessed loosely in an elongate cavity 508 (FIGS. 12 and 13). The respective end portions 14E and 17E of the lighted handle 10E are received loosely in holes 506 in end walls 509 of the cavity 508, to allow installation by angling the handle 10E into one (the left one in FIG. 12) of the holes 506 beyond its solid line position in FIG. 12 (as shown in dotted lines at 510'), pivoting the handle 10E to its solid line axis in FIG. 12, and then pulling the handle 10E rightwardly into the rightward hole 506, to the extent shown in FIG. 12.

A suitable fixing and bonding substance 507, such as an acrylic caulk is then applied between the cavity end walls 509 and the end portions 14E and 17E to close the holes 506 and to fix the handle 10E to the cavity end walls 509 with the wires 68E hidden behind the surface 505, for connection to a suitable power supply. Once the handle 10E is fixed to the cavity end walls 509, there is preferably sufficient space between the walls 509 and the handle 10E to allow for hand gripping of the handle.

The FIGS. 12 and 13 embodiment is of use as a lighted handle on a door, such as a cargo or engine compartment door on a recreational vehicle. In this use, once the handle 10E is fixed on the door, the inserts 41E, and thus the LEDs therein, can be accessed from the backside of the door. Therefore, in the unlikely event that the LED needs replacing, the back portion of the insert 41E can be removed to expose the LED therein. Once the LED is replaced, the insert 41E can be reassembled. Thus, the LED can be replaced without the need to remove the lighted handle 10E from the door.

Applicant has found it advantageous in the disclosed invention to minimize the number of major parts, particularly custom manufactured parts, to thus minimize initial cost to the buyer.

Moreover, Applicant has found it advantageous to minimize maintenance by using light sources having a long service life (LEDs have many times the expected service life of the average incandescent bulb, for example).

Moreover, Applicant has found it particularly advantageous to minimize the electric power consumed by a lighted handle when same is driven by an electrical source of limited capacity, such as the vehicle battery on trucks, recreational vehicles and boats, in situations where it is not practical to connect to the nationwide electrical power grid. Whereas a typical incandescent bulb would waste a significant part of its electrical energy input in producing heat and the need to direct most of its 360° light output by means of imperfect real world reflectors (e.g. due to light absorption at the surface of the reflector and reflector light scattering), Applicant finds that a typical LED is free of such energy waste (e.g. an LED does not produce noticeable heat, if any, and provides a narrow light output beam without need for a reflector).

Thus, as used in the present invention, an LED can supply more than sufficient lighting of the light transmitting member 11, with surprisingly little electric power.

For example, a typical high output (5,000 millicandela (mcd)) LED in use draws 0.020 milliamperes (mA). Indeed, a circuit (e.g. in FIG. 10) connecting several (e.g. 2) such LEDs in series, along with the proper series load resistor R, draws the same 0.020 mA. With that circuit connected through a switch S across a nominal 12 volt vehicle battery B of the kind mentioned above, the in-use power draw is thus only about ¼ of a watt, a load sustainable for many hours, without need for recharge, excessive discharge or damage, by a typical 80 ampere hour vehicle storage battery. Indeed, with the particular LED type mentioned above operated at the current level mentioned above, a single ¼ of a watt circuit could include two of Applicant's FIG. 6 dual LED grab handles or four of Applicant's FIGS. 1-5 single LED handles. Even if operated at above nominal rated current levels (e.g. at 40 mA) for a substantial increase in light output, such a multi-LED circuit would still draw only about ½ of a watt to illuminate one dual LED handle or two single LED handles, and without an inconvenient reduction of operating life span.

The wattage requirement for handles of comparable light transmitting bar light output using incandescent light sources would be substantially higher and the operating life substantially lower.

It should be appreciated that the present disclosure is for the purposes of illustration only, and alternative embodiments of this invention are possible without departing from the scope of the claims. For instance, the white LED light emitters included in the light assemblies illustrated herein could be replaced by a red LED light emitter. This alternative might be preferable for use at night to help preserve night vision of an RV driver or boat helmsman. Additionally, the outer surface of the light transmitting member 11 could be etched or marked to include a family or product name or a logo. Further, while only a single O-ring has been illustrated forming a seal between the end, or ends, of the light transmitting member 11 with the respective end bracket(s), two or more O-rings could instead be used. Alternatively, a different non-permanent sealing means could instead be substituted.

Further Modification

FIGS. 14-19 show a further modification in which structural elements corresponding to structural elements of previously described embodiments carry the same base reference numerals with the suffix "F" added. FIGS. 14-19 show a modified lighted handle 10F which may be similar to lighted handles above described, except as follows.

As seen in FIG. 17, the recess 23F, of the bracket 12F of the lighted handle 10F, has an inner peripheral wall 614 which is preferably slightly tapered (e.g. between 1° and 4° incline angle). This taper accommodates slight variations in the angle between the central and end portions of the light transmitting bar 14, as may result from variations in manufacturing. The recess 23F communicates, at a coaxial annular step 622, with the elongate opening, or passage, 33F which opens through the bottom of the mounting foot 28F.

The upper (in FIG. 17) end portion 615 of the passage 33F is of diameter to snugly receive an illumination unit 61F, e.g. similar to that of FIG. 2A. The illumination unit 61F bottoms against the bend 616 in the inner periphery of the midportion of the passage 33F and extends axially (upwardly and rightwardly in FIG. 17), such that the open end of its reflector casing 43F is flush with (or as shown somewhat beyond) the step 622.

The light transmitting member 11F has a neck 21F (corresponding to the leftward neck in FIGS. 14 and 16) having a free end 626 which is formed as a diametral flat. Thus, the neck 21F omits the FIG. 2A recess 23. The flat free end 626 is preferably smooth and, may be polished to achieve a desired smoothness.

An annular step 628 coaxially joins the light transmitting member end portion 14F to the reduced diameter neck 21F. An annular fillet 629 at the radially inboard portion of the step 628 may be provided, to strengthen the connection of the neck 21F to the end portion 14F.

As seen in FIG. 17, the light transmitting member neck 21F is snugly received in the bracket recess 23F, such that the light transmitting member step 628 abuts the open top free end 37F of the bracket 12F. The illuminating unit emitting end may abut, or as in the embodiment shown, may be spaced from, the neck free end 626. Such spacing may be substantial, without noticeably reducing LED illumination of the neck free end 626, given an LED 62F of modest beam angle, (e.g. 10° to 20°). The light emitting unit 61F may be removable from the bracket 12F, e.g. in the unlikely event of need to replace some part thereof. The light emitting unit 61F, if removable, may be a friction fit in the passage 33F, or free to move axially against or toward the adjacent light transmitting member end portion 14F. The open top free end 37F of the bracket may carry a radially inward facing annular round 630, complementary to the fillet 629 of the light transmitting member step 628. The outer peripheral surfaces 632 and 633, respectively, of the light transmitting member end portion 14F and bracket 12F are preferably of the same diameter and mutually flush, to provide a substantially unbroken profile from the bracket 12F to the light transmitting member 11F. Thus, direct and reflected light from the LED 62F passes directly through the flat end face 626 and through the length of the light transmitting member 11F, as in the above described embodiments.

The other (rightward in FIG. 18) end of the handle 10F may be similar to the leftward end of FIG. 17. Thus, the light transmitting member second end portion 17F (the rightward end portion as shown in FIG. 18) may be identical to that of FIG. 17 above discussed and similarly provided with an illumination unit like that at 61F at FIG. 17, just as in FIG. 6 discussed above.

Figure 18:
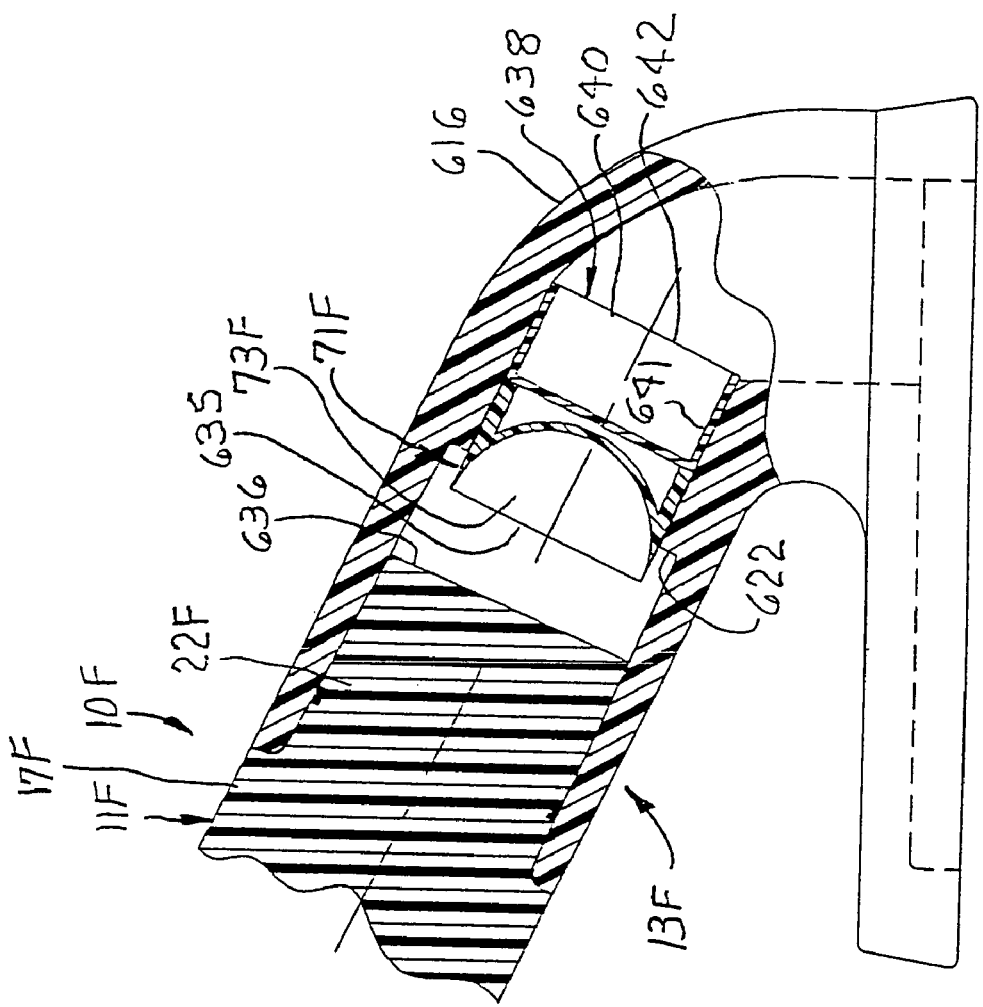
FIG. 18 is a view similar to FIG. 17 but of the opposite end portion of such a lighted handle.
Figure 19:
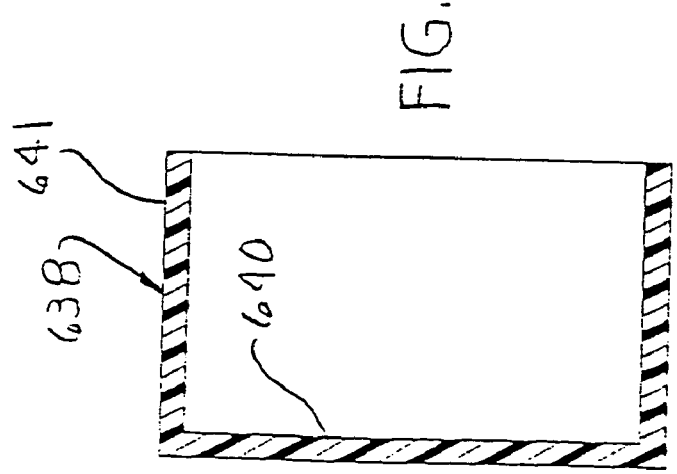
FIG. 19 is an enlarged central cross-sectional view of a spacer member of FIG. 18.

Alternately, and as shown in FIG. 18, the light transmitting member end portion 17F and bracket 13F at the second (rightward in FIG. 18) end of the handle 11F may omit such an illumination unit 61F, and instead be provided with a light deflecting unit 71F, generally like that in FIG. 1C. The outboard edge 635 of the concave reflector 73F of light deflecting unit 71F, opposes (and may be spaced from) the free end 636 of the second (rightward in FIG. 18) neck 22F of the light transmitting member 11F. The free end 636 is preferably identical to the free end 626 above described with respect to FIG. 17. The bracket 13F is preferably identical to the bracket 12F of FIG. 17. The neck 22F and the light deflecting unit 71F are received in the bracket 13F preferably in a manner similar to the neck 21F and illumination unit 61F of FIG. 17. If desired to facilitate at least initial axial location of the light deflecting unit 71F in the bracket passage 33F, a spacer member 638 (FIG. 19), here a cylindrical cup, conventionally formed with a radial end wall 640 and circularly cylindrical peripheral wall 641, may be snugly received in the passage 33F with its end wall 640 abutting the light deflecting unit 71 and its free annular edge 642 bottomed against the bend 616 in the inner periphery of the mid portion of the passage 33F of the bracket 13F. The deflecting unit 71F may be irremovably fixed in the bracket 13F, e.g. by an adhesive material and in that instance the spacer member 638 may, as an option, be omitted.

Thus equipped, the FIG. 18 end portion of the lighted handle 10F receives light through the light transmitting member 11F from the other, FIG. 17, end of the handle and reflects it back along the light transmitting member 11F to the reflector 45F of FIG. 17, such that the light transmitting member is illuminated in the manner above discussed with respect to FIGS. 1A and 1C, though with an advantageous reduction in cost and complexity.

Further Modification

Figure 20:
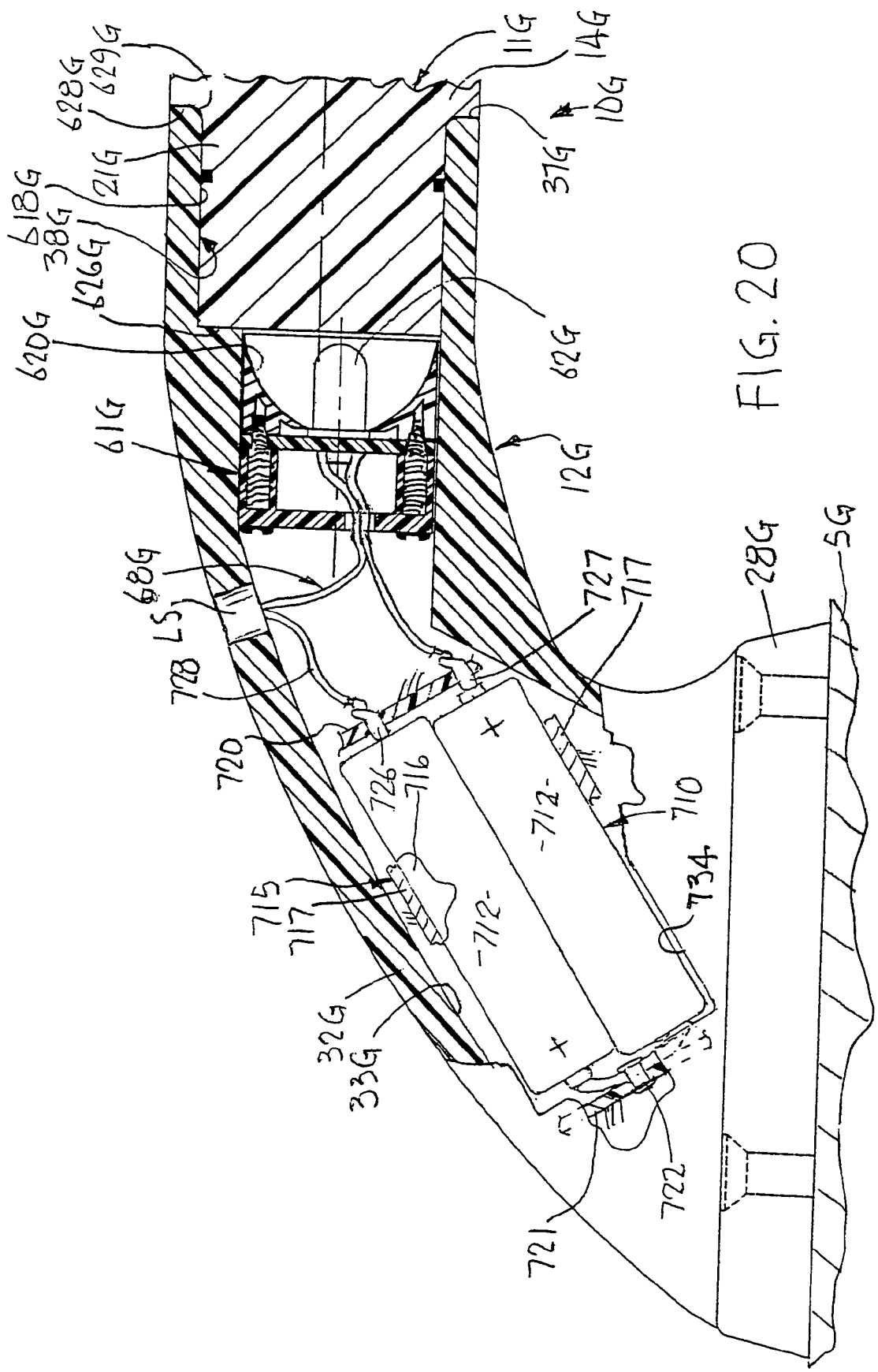
FIG. 20 is a view similar to FIG. 17 but showing a further modified lighted handle adapted to house an electric source.
Figure 21:
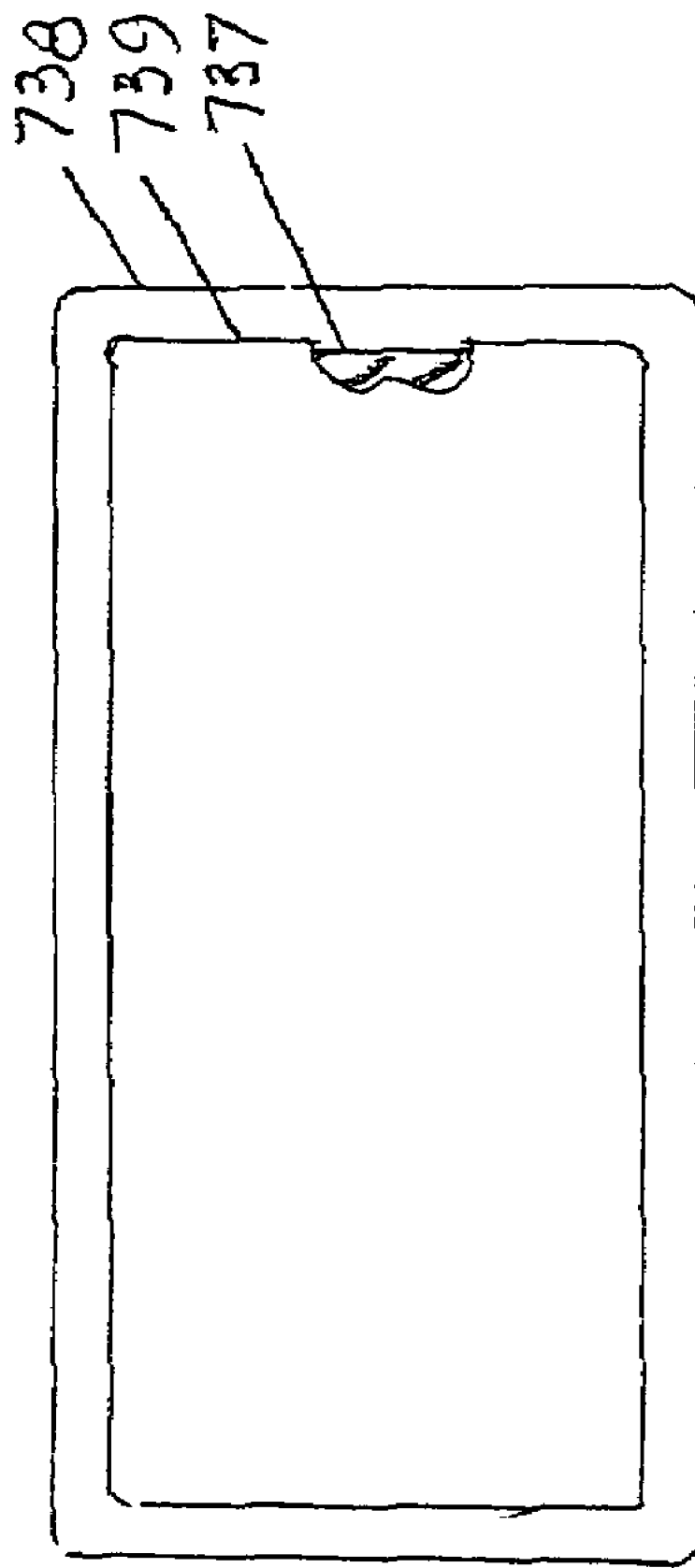
FIG. 21 is a partially broken view of a portal closure plate of FIG. 20.
Figure 23:
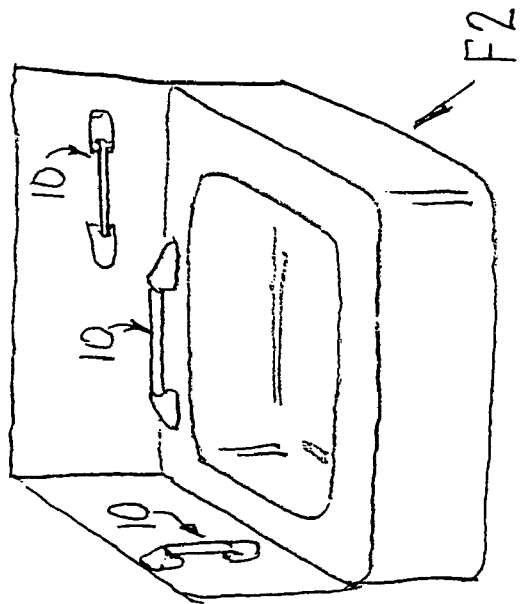
FIG. 23 is a pictorial view of a bath tub/spa and surround provided with lighted handled embodying the invention.
Figure 24:
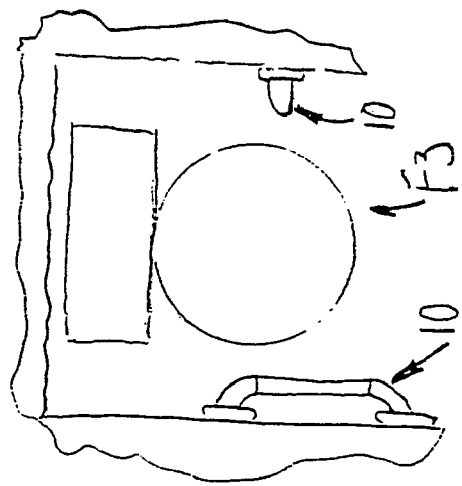
FIG. 24 shows a toilet installation with an adjacent lighted handle embodying the invention.

FIGS. 20 and 21 show a further modification, in which structural elements corresponding to structural elements of previously described embodiments carry the same base reference numerals with the suffix "G", added. FIGS. 20 and 21 show a modified lighted handle 10G which is similar to lighted handles above described, except as follows.

The light transmitting member 11G of FIG. 20 is preferably similar to the light transmitting member 11F of FIGS. 14-19, except that it is straight (e.g. like the light transmitting member 511 of FIG. 12) rather than bent as in FIG. 14. As seen in FIG. 20, the end portion 14G of the light transmitting member 11G includes a neck 21G having a radially extending, flat end 626G and is joined to the central portion of the light transmitting member 11G by a coaxial annular step 628G provided with an annular fillet 629G, e.g. as in the FIG. 14-19 embodiment.

The FIG. 20 lighted handle 10G includes a bracket 12G which differs from the bracket 12F of FIG. 17, substantially as follows. Because the light transmitting member 11G is straight and its length axis preferably extends substantially parallel to a handle supporting surface 5G, the bracket 12G must bend, or curve, through substantially a right angle, from its support surface engaging foot 28G to its recessed end 37G (rightwardly facing in FIG. 20). The recess 38G substantially coaxially receives the neck 21G of the light transmitting member 11G. However, in contrast to the foregoing embodiments, the central length axes of recess inboard portion 620 and outboard portion 618, though parallel, are radially offset. More specifically, as seen in FIG. 20, the lowermost portions of the peripheral walls of the recess inboard and outboard portions 620 and 618 are axially aligned. Restated, in a geometric sense a cylinder may be defined by an infinite number of circumferentially adjacent, parallel line elements, and in that sense the bottommost (in FIG. 20) line element of the inboard recess portion 620 substantially coincides with that of the outboard recess portion 618. This offsets the inboard recess portion 620 (downward in FIG. 20) away from the upper portion of the bracket peripheral wall 32G, to avoid (1) thinning and weakening of or (2) requiring an unsightly outward (upward in FIG. 20) bulge in the smooth curvature of, such peripheral wall 32G. Surprisingly, the resultant radial offsetting of the length axes of the illumination unit 61G and light transmitting member 11G does not degrade the quality of the light radially emitted by the light transmitting member 11G.

The other (rightward in FIG. 20A) end of the handle 10G may be similar to the leftward end of FIG. 20. Thus, the light transmitting member second end portion 17G (the rightward end portion as shown in FIG. 20A), may be identical to that of FIG. 20 above discussed and similarly provided with an illumination unit like that at 61G at FIG. 20, just as in FIG. 6 discussed above.

Alternately, and as shown in FIG. 20A, the light transmitting member end portion 17G and bracket 13G at the second (rightward in FIG. 20A) end of the handle 11G may omit such an illumination unit 61G, and instead be provided with a light deflecting unit 71G, generally like that in FIG. 18. If desired to facilitate at least initial axial location of the light deflecting unit 71G in the bracket passage 33G, a spacer member 638G, e.g. similar to the spacer member 638 of FIG. 19 may be snugly received in the passage 33G with its end wall 640G abutting the light deflecting unit 71G and its free annular edge 642G bottomed against bend 616 in the inner periphery of the mid portion of the passage 33G of the bracket 13G. The deflecting unit 71G may be irremovably fixed in the bracket 13G, e.g. by an adhesive material and in that instance the spacer member 638G may as an option, be omitted.

The disclosure of the preceding embodiments has emphasized electrical energization of the light emitter 62 through insulated wires 68 running into the corresponding illumination unit (e.g. 61) from a remote energy source. One example is the FIG. 5 "DC SUPPLY" which supplies relatively low DC voltage through the wires 68 to the corresponding lighted handle. One such "DC SUPPLY" may be a conventional 12 volt vehicle storage battery.

Figure 31:
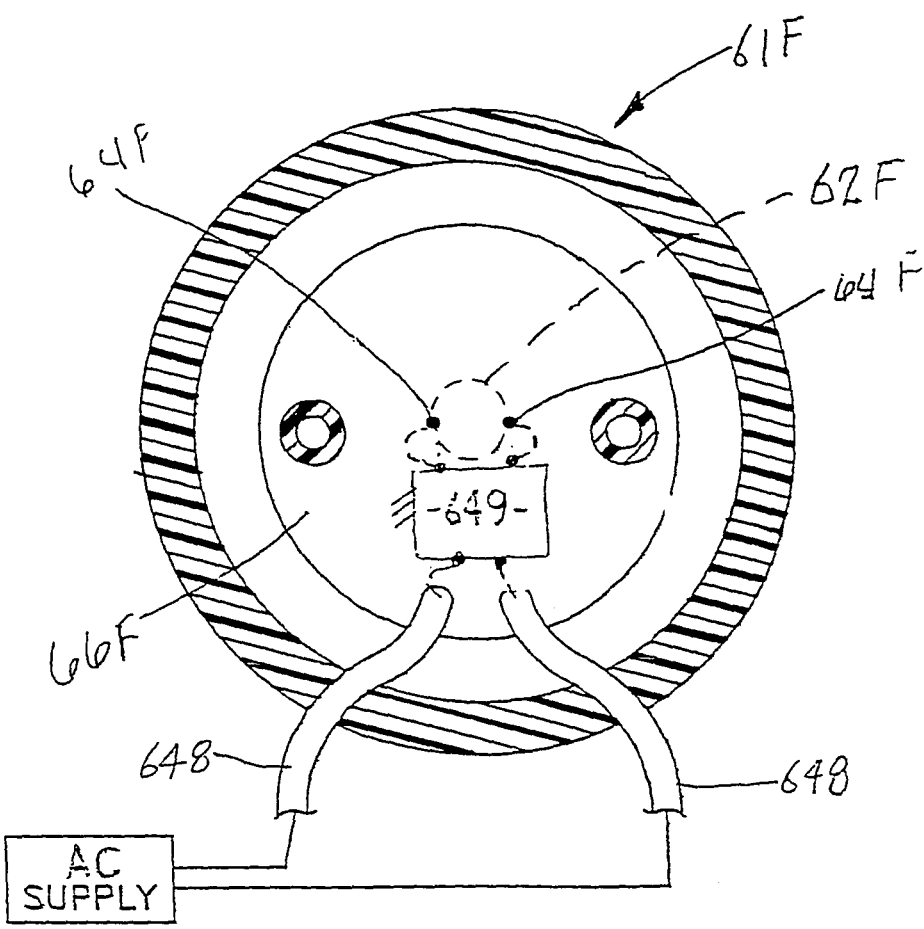
FIG. 31 is a view similar to FIG. 5, but showing a modification including a high AC voltage to lower DC voltage converter.

Another example is the FIG. 31 "AC SUPPLY" serving as the remote energy source, and which conveniently may be a conventional, 120 volt AC house current outlet. The latter supplies AC energy through insulated wires 648 to the input side of a voltage dropping, AC-to-DC converter 649 of any conventional type. A variety of such converters are known. Typical ones use a transformer (or more compactly a resistive voltage divider) to provide a reduced AC voltage to a rectifier (for example, a full wave bridge rectifier) which produces a pulsed DC voltage, which in turn is reduced to a substantially ripple-free DC voltage of desired amplitude by a suitable filter and/or Zener diode. One example used a Zener diode and capacitor connected in parallel across the output of a full wave bridge rectifier with the desired amplitude DC voltage appearing across the Zener diode in a conventional manner.

Figure 32:
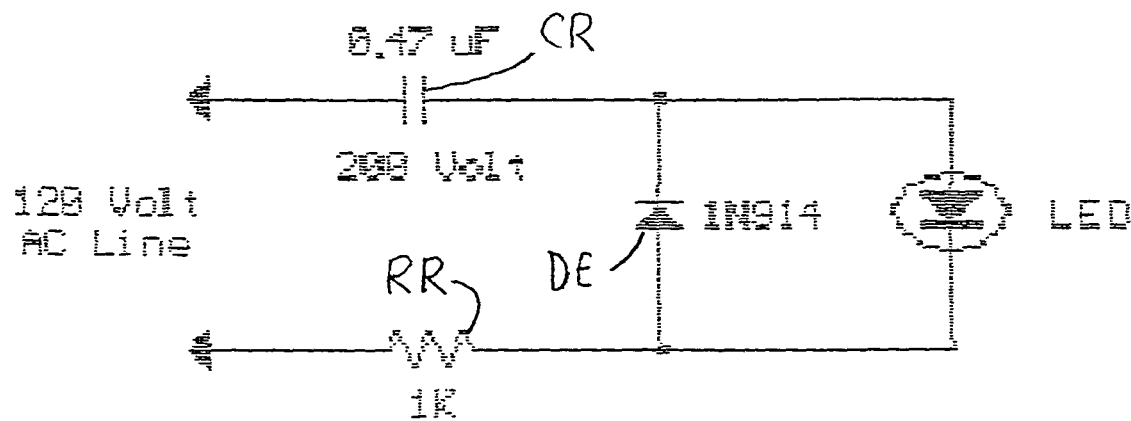
FIG. 32 is a schematic circuit diagram.

An even simpler (only three components) conventional converter circuit is shown in FIG. 32 and comprises a capacitor CR, resistor RR and diode DE connected as shown between a 120 volt AC source and an LED.

While converter circuits of this kind are commercially available in various sizes and shapes, it is convenient to provide same, as seen in FIG. 31, as a compact chip or module 649 on the circuit board 66F of the illumination unit 61F. In FIG. 31, the DC output voltage of the converter 649 is conveniently selected for direct connection to the electrical supply conductors 64F of the corresponding light emitter (e.g. LED) 62F. For example, given a conventional white LED having a input voltage rating of 3.6 to 4 volts, 3.8 volts might be selected as the DC output of the converter 649, which may keep current flow through the LED low enough to avoid damage thereto and yet provide substantially rated light output. AC energy supply to a lighted handle, as in the manner of FIG. 31, may be advantageous for lighted handles installed in buildings (e.g. dwellings) in any desired locations. Location examples might include adjacent doorways or in stairwells or hallways.

Nonlighted grab handles have often been provided for people, including disabled and/or elderly people, to aid movement at locations in commercial buildings and in dwellings, e.g. adjacent fixtures such as sinks, toilets, bidets, shower stalls, bathtubs, spas, etc.

However, Applicants have noted that grab handles may be needed in locations that are dim or dark, e.g. at night or due to inadequate ambient lighting, or may be used by persons having various visual impairments. Applicants further note that such grab handles would be more effectively useable if lighted. As an example, consider in the middle of the night, with poor or no ambient light, a person waking and arising from bed to make his/her way into the bathroom to get a drink of water or use the toilet, perhaps somewhat disoriented and unsteady on his/her feet, whether or not disabled or elderly. A grab handle may be of assistance there, but only if the person can see it. Applicants note that even a dimly lighted grab handle embodying the invention has the substantial additional benefit of helping to guide the person's eye to it, guide his/her movement toward it, and guide his/her hand into grasping engagement with it. As to the latter, in darkness sufficient that a person cannot see his/her hand otherwise, placing that hand on an imaginary line between the eye and the lighted handle, and moving it away from the eye along that line, eventually brings the hand into contact with the lighted handle.

Thus, FIGS. 22-24, 26 and 27, for example, show lighted handles, preferably of the bracket mounted type herein discussed, fixed to or adjacent fixtures, schematically indicated at F1, F2, F3 and F4 (F3 indicating a toilet and F1, 3 and 4 indicating a hot tub/spa, bathtub, and shower equipped tub). For convenience, these lighted handles are referenced by the numeral 10, though it will be understood that such lighted handles are not limited to the FIGS. 1-5 embodiment. Also, FIG. 26 shows a fixture F4, representing a shower stall, or bathtub shower enclosure, having a cavity 508H in a surface 505H thereof and a straight lighted handle 10H whose light transmitting member 11H has ends anchored in the end walls 509H of the cavity 508H, generally in the manner shown above in FIGS. 12 and 13 as to the surface 505, cavity 508, end walls 509, and light transmitting member 511.

Whereas in new construction it may be easy to install wiring inside of as yet unclosed walls, to connect a remote electric power source to a lighted handle to be fixed on such wall, it may be difficult or impractical to do so in retrofitting a lighted handle on the wall of a room or fixture (e.g. as in FIGS. 22-26) already installed in an existing dwelling.

Applicants have discovered that it is possible to make a lighted handle electrically self-contained, and to not require connection to wiring in the building wall or fixture to which it is attached, by incorporating in the lighted handle itself a sufficient, and if desired, replaceable, electric power supply, and a light emitting element (like an LED), capable of producing useably visible light even at very low electric current usage levels.

For decades, the common, compact, dry cell operated light emitter has been the incandescent flash light bulb. Unfortunately, such flashlight bulbs are substantially less efficient (in terms of light output for electrical energy consumed) than the usual 60 watt or 100 watt household incandescent light bulb. Applicants note that all incandescent bulbs may be characterized as electrically powered heating devices which, if voltage and current input are sufficiently increased, begin to emit light. Restated, as a conventional flashlight incandescent bulb consumes electric power and drains stored battery energy, battery voltage and current output drops, and the incandescent bulb grows dim, and eventually dark. However, though dark, it continues to draw current, to heat (though to a lesser degree) its filament and thus continues to drain the battery.

Moreover, one common incandescent bulb, sold for use in flashlights powered by two C size or D size dry cells, has a rated current draw of 500 milliamps. One incandescent bulb sold for use in flashlights powered by two AA size dry cells is rated at 270 milliamps. These levels of electric power consumption tend to drain even relatively high capacity, e.g. alkaline, battery cells, to the point where the incandescent bulb dims and goes dark, in a matter of hours. Such an incandescent bulb may go dark while still consuming as much as half its rated current.

Applicants have thus determined that such a bulb, as the light emitter in a lighted handle, would require a battery cell power supply too bulky to be housed in a lighted handle of practical size and/or would require replacement of battery cells too frequently i.e. on a more or less daily basis.

Applicants have noted certain characteristics of an LED make it possible to provide a lighted handle with a compact battery pack, without changing the outside appearance of the lighted handle (at all or little if any) and to illuminate such handle at relatively low but still visible (in low ambient light such as in the example given above) levels, without need to replace the onboard battery pack for days or weeks or perhaps more, depending on the lowest acceptable level of handle visibility.

The mentioned LED characteristics include the following.

First, LEDs of the type shown herein are self-focused and so provide a relatively narrow light beam (e.g. the light output on the central axis of the LED is reduced to half at angles in the range of 15-45° off that axis, depending on the design of the particular LED), such that substantially all of the light output of the LED is applied to the opposed end of the light transmitting member in Applicants' embodiments disclosed herein.

Second, the light output of an LED is normally rated at a current level (typically 20 milliamps) about an order of magnitude less than the mentioned incandescent flashlight bulbs.

Third, a common LED continues to provide at least dim light at electric current inputs several orders of magnitude lower than the mentioned incandescent flashlight bulbs. For example, in one experiment a lighted handle like that shown in FIGS. 1-5 and 8 herein, having a single white LED 62 powered by two conventional alkaline cells, was visible throughout its length in a darkened room at electric current levels substantially less than 100 microamps, as measured by a digital DC ampmeter capable of readouts down to 10 microamps. At such low current levels the lighted handle did not illuminate objects around it, but was itself visible. A hand reaching for such handle could be seen to mask a corresponding part of the light transmitting member of the handle, to help guide the hand to the handle, even when in a room so dark that such hand was not otherwise visible.

Fourth, as the voltage applied across a typical LED declines (as due to draining of its DC supply battery cells), the internal resistance of the LED rapidly, nonlinearly increases. Thus, if a given LED has an internal resistance near 100 ohms at its rated 20 milliamp current level, that internal resistance may grow to tens of thousands of ohms and higher, as current flow through the LED falls into and through the microamp range. This LED internal resistance increase greatly slows the draining of the battery cells, and so increases the time period over which its battery cells can drive the LED to produce useful, though low, levels of light.

Thus, Applicants have found that the typical LED is capable of emitting low but useful levels of light at very low levels of energy consumption, such that even a pair of conventional alkaline AA battery cells may last for days or weeks or even more. Thus, Applicants have found that these LED characteristics, mated with the visibility of the inventive lighted handle at low light levels, makes it practical to provide a lighted handle which carries its own electrical source, is thus self-contained, and does not require frequent battery cell replacement.

FIG. 20 shows an example of a lighted handle which incorporates its own electrical energy source and is thus self-contained in the manner above discussed. More particularly, in FIG. 20, the hollow interior passage, or opening, 33G of the bracket 12G contains a replaceable battery pack generally indicated at 710. By way of example, the battery pack 710 shown in FIG. 20 comprises a pair of conventional long life (e.g. alkaline) AAA battery cells 712. The cells 712 are, for purposes of example, shown as removably fixed within the bracket 12G by a generally U-shaped cradle schematically indicated at 715. The cradle 715 is preferably fixed with respect to the bracket peripheral wall 32G, as by casting integrally therewith, adhesive bonding, or otherwise as desired. The cradle 715 here comprises a back wall 716 and laterally spaced arms 717 which releasably fix the cell 712 and 713 within the bracket 12G. At opposite ends of the cells 712, laterally extending, electrically insulative, upper and lower plates 720 and 721 are conventionally fixed, as by adhesive bonding, with respect to the peripheral wall 32G of the bracket 12G. The insulative plates 720 and 721 are conveniently of a conventional, insulative, rigid plastics material. The lower plate 721 has fixed thereon, as by a rivet 722, an electrically conductive leaf spring, of shallow U-shape, whose ends bear against the adjacent ends of the cells 712 and resiliently urge same toward the upper plate 720. The upper plate 720, as schematically indicated in FIG. 20, has fixed, through extending, electrical contacts 726 and 727 against which the upper ends of the cells 712 are resiliently urged by the leaf spring 724. Opposite polarity ends of the cells 712 electrically engage the contacts 726 and 727 respectively, such that the cells 712 connect in series from the contact 726 through the leaf spring 724 and to the contact 727. The series voltage of the cells 712 thus appears across the contacts 726 and 727. The contacts 726 and 727 are electrically connected to the wires 68G which energize the illumination unit 61G and thus the LED 62G therein.

The cells 712 may thus be connected directly in circuit with the illumination unit 61G, or through a switch or switches interposed in circuit therewith. As seen schematically in FIG. 25, such circuit may include a manual ON/OFF switch MN and/or a light sensing switch LS, here a light sensing switch which opens in response to relatively higher levels of ambient light and closes in response to relatively lower levels of ambient light (and hence is closed and thus conductive in darkness). The switches MN and LS are in series with the LED 62, its voltage dropping resister 67 (if present), and the cells 712. Assuming the manual switch MN either absent or closed, the light sensing switch LS conducts current from the cells 712 through the LED 62 to produce a light beam therefrom, when in sufficiently dim or dark circumstances, and opens to preserve battery energy, when ambient light supplies sufficient visibility and/or would overwhelm the light output of the LED 62.

Figure 25:
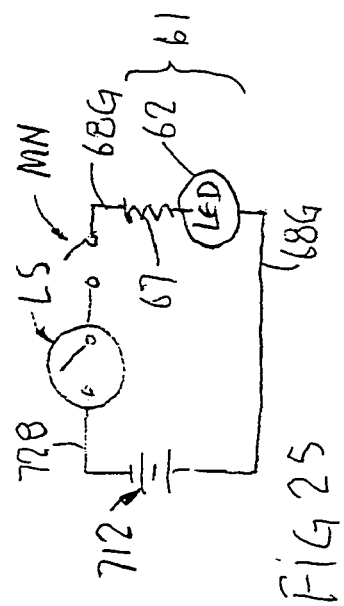
FIG. 25 is a schematic drawing of a circuit useable in the lighted handle of FIG. 20.

In the FIG. 20 embodiment, such a light sensing switch LS is fixed with respect to the bracket 12G to monitor ambient light. Conveniently, as shown, the switch LS is a conventional, generally cylindrical unit which is fixedly recessed in the peripheral wall 32G and senses light illuminating the adjacent portion of the bracket peripheral wall 32G. The illumination unit wires 68G and a further wire 728, all of which are conventionally insulated wires, thus connect the cells 712 in series with the illumination unit 61, as shown in FIGS. 20 and 25.

Access to the cells 712 for installation and replacement thereof, can be provided as desired. In the embodiment shown, the peripheral wall 32G of the bracket 12G is provided with a generally rectangular profile portal 734 sized and located to readily permit replacement of the cells 712. In use, the portal 734 may be closed in any convenient manner, such as a hinged door or the like. However, in the embodiment shown, a resilient closure plate 736, preferably of a rubber-like material, has a generally rectangular body sized to snugly fit the portal 734, an exterior portion carrying a flange 738 sized to snugly overlap the material of the bracket peripheral wall 32G adjacent the portal 734, and a narrow interior flange 739 sized to snap fit through the portal 734 and bear on the interior surface of the bracket peripheral wall 32G to resiliently, preferably in a waterproof manner, close the portal 734. To the extent the bracket peripheral wall 32G adjacent the portal 734 is 3-dimensionally curved, the closure plate 736 may have a conforming 3-dimensional shape.

Thus, when battery usage over a period of time has caused the LED 62 to dim below a minimum acceptable level, the used cells 712 are readily replaceable by fresh ones.

The output voltage of the battery pack 710 (FIG. 20) may be matched to the rated, or maximum acceptable, voltage of the LED 62G, to provide the desired balance of LED light output and battery pack life span.

As a first example, the expected 3 to 3.2 initial output voltage of two new alkaline cells in series could drive an appropriately rated LED, e.g. a yellow 5 mm LED rated at 20 milliamps current flow with an applied voltage of typically between 2.6 and 3 volts, at or somewhat above its rated current, and hence rated light output. This would initially provide brighter light output but fastest battery drain and output voltage diminution.

As an alternative second example, the same 3 to 3.2 volt initial output voltage battery pack might instead be mated to an LED having a higher nominal voltage rating, e.g. a white LED rated at 20 milliamps current flow with an applied voltage in the range of 3.6 to 4 volts, for initially substantially (perhaps by an order of magnitude or so) lower than rated current flow and light output. This lower-than-rated initial current flow and light output would substantially slow battery drain and output voltage diminution, and hence give a longer time between battery replacements. This could also be done with closer voltage matched battery pack/LED combination by providing, or increasing, the resistance of a load resistor 67 (FIG. 5).

The human eye/brain combination is most sensitive to light of one color (wavelength) than others (perceives the one as brighter than the others, with all at the same measured candela level). Applicants note that appropriate choice of LED color may provide a brighter appearing lighted handle, with longer battery pack life. For example, publications suggest that humans perceive yellow/green light as brighter than red or blue light.

It will be understood that the light transmitting light bar 11G of FIG. 20 will normally have at its rightward end (not shown) a second support bracket preferably identical to the bracket 12G of FIG. 20. Such second support bracket may include another illumination unit 61G, or (in the manner of the FIG. 18 bracket 13F) may merely include only a light deflector. Illumination unit equipped brackets at both ends of the handle 10G preferably would each include its own replaceable battery pack, e.g. each comprising elements 710-739 of FIGS. 20 and 21.

While the FIG. 20 example shows energization of the LED 62 by a pair of conventional alkaline AAA cells, it is contemplated that other types of electrical supply may be substituted.

For example, cells of different physical configuration, voltage, energy capacity, etc., and/or a different number of cells may be substituted. In one variation, three new alkaline cells in series would produce a higher voltage than two and, with an appropriate load resistor (as at 67 in FIG. 5), could provide a brighter initial light output from an LED of suitable voltage rating (e.g. a known white LED of rated 0.020 milliamp output at between 3.6 and 4 volts thereacross).

Also, more sophisticated circuitry might be interposed between the LED 62 and its electrical supply. For example, it is known to use a single 1.5 to 1.6 volt cell to drive an oscillator to in turn drive an LED at its rated, or higher, voltage, and/or drive an LED with pulses of substantially higher voltage, than the rated voltage of the LED, but at less than a 100% duty cycle.

However, the FIG. 20 circuit is preferred for its combination of adequate light output, infrequent battery replacement, compactness, simplicity and low cost.

While FIG. 20 exemplifies a self-contained battery pack in a lighted handle whose light transmitting member is spaced from a substantially parallel support surface by footed brackets, it is contemplated that a lighted handle, like that at 510 in FIG. 12, whose ends are behind wall structure, might also be served by a readily accessible, replaceable, adjacent battery pack. FIG. 27 schematically illustrates an example in which a cradle 715H holds replaceable cells 712H in a recess in a portion 505H of a wall or fixture through which the lighted end of the light transmitting member 511H extends. A door 736H, or the like, may be provided to close and seal entry to the recess and secure the cells 712H against accidental dislodgement or contact with adjacent water spray.

Figure 29:
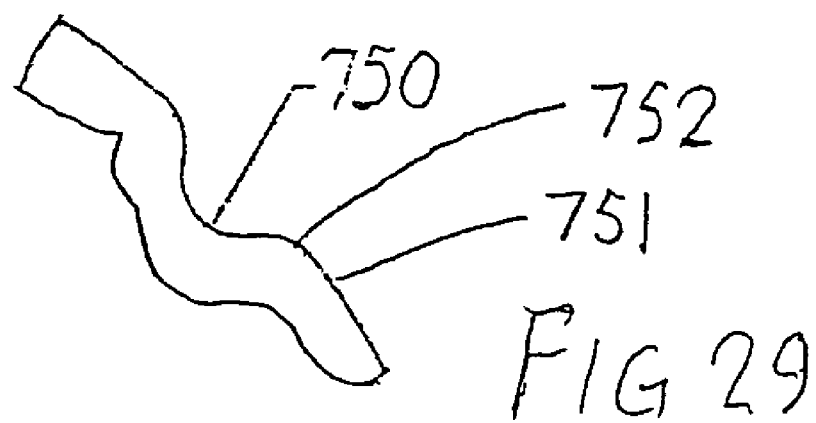
FIG. 29 is an enlarged fragment of FIG. 28.
Figure 28:
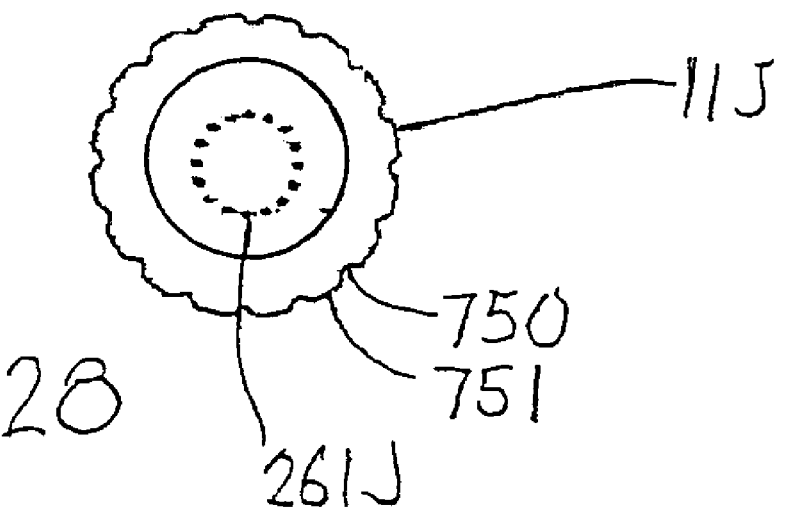
FIG. 28 is an end view of a modified light transmitting member having a readily gripped peripheral surface.

FIGS. 28 and 29 show a further modification, in which structural elements corresponding to structural elements of previously described embodiments carry the same reference numerals with the suffix "J" added.

The light transmitting member 11J of FIGS. 28 and 29 has an outer peripheral surface which is textured to facilitate gripping by the hand of the user. While such texturing may take a variety of forms, in the embodiment shown a plurality (for example 16) of preferably evenly circumferentially spaced, semi-circular, rounded edge grooves 750 extend axially along the periphery of the light transmitting member 11J. With the grooves 750 extending from one neck to the other (for example the necks 21 and 22 of FIGS. 1A and 1C), such grooves may conveniently be co-extruded with the light transmitting member 11J. The peripheral surface of the light transmitting member 11J, circumferentially between the grooves 750, thus appears as a circumferentially spaced array of axially extending ribs 751. In the embodiment shown, the circumferential transition 752 from groove 750 to rib 751 is preferably rounded for the comfort of the user's hand gripping the light transmitting member 11J. The purpose of the texturing 750, 751 is hand grip enhancement, not enhancement of the visibility of the light transmitting member 11J. Indeed, FIG. 28 shows, for purposes of enhancement of visibility, strips 261J preferably coextruded within the light transmitting member 11J and spaced circumferentially from each other and radially inward of the periphery of the light transmitting member 11J, generally in the manner of the above discussed strips 261 of FIGS. 7 and 7A.

It should be apparent that surface texturing exemplified at 750, 751 in FIG. 28 and/or internal strips like those at 261 and 261J can be provided in connection with light transmitting member in any or all embodiments of the invention, as desired. Indeed, it is contemplated that structural features disclosed herein in connection with any given embodiment may be applied to other embodiments of the invention, to the extent structurally and functionally possible.

Figure 30:
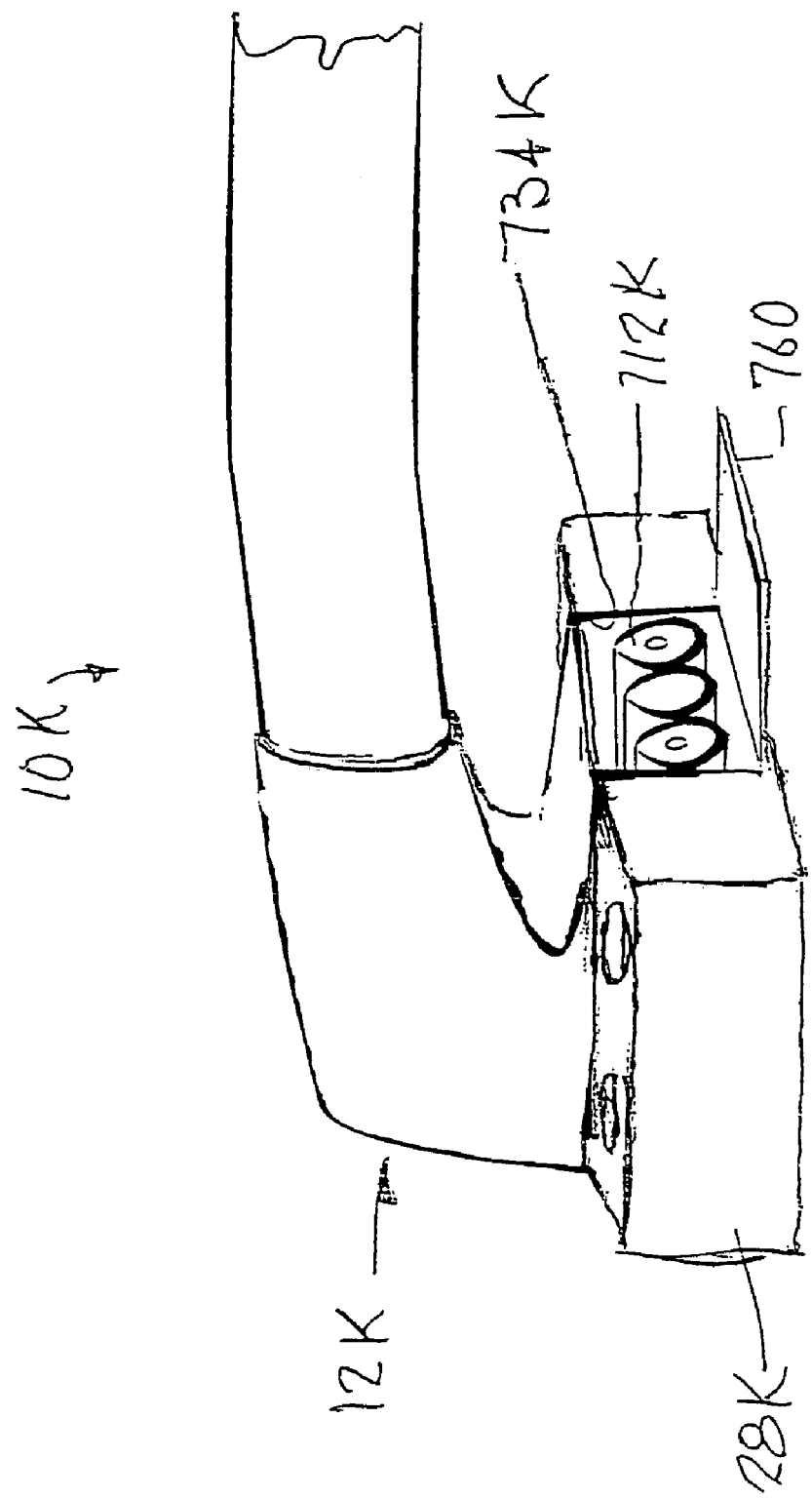
FIG. 30 is a fragmentary, schematic, pictorial view of a further modified lighted handle adapted to house an electric power source.

FIG. 30 shows a bracket 12F, generally corresponding to the bracket 12G of FIG. 20 but with reconfigured structure for receiving an on-board energy source, e.g. battery pack.

More particularly, the modified FIG. 30 bracket 12K includes a mounting foot enlarged to receive an energy source, e.g. three or more AA dry cells 712K, side by side through a lateral portal opening 734K, which in the embodiment show, faces toward a bracket (not shown) at the opposite end of the lighted handle 10K. After inserting cells 712K, the portal 734K is closeable by a closure, such as a conventionally hinged door 760. The cells 712K are connected in circuit with a light source (not shown) in the bracket 734K, generally as discussed above with respect to FIGS. 20 and 25 or in any desired conventional manner.

Figure 33:
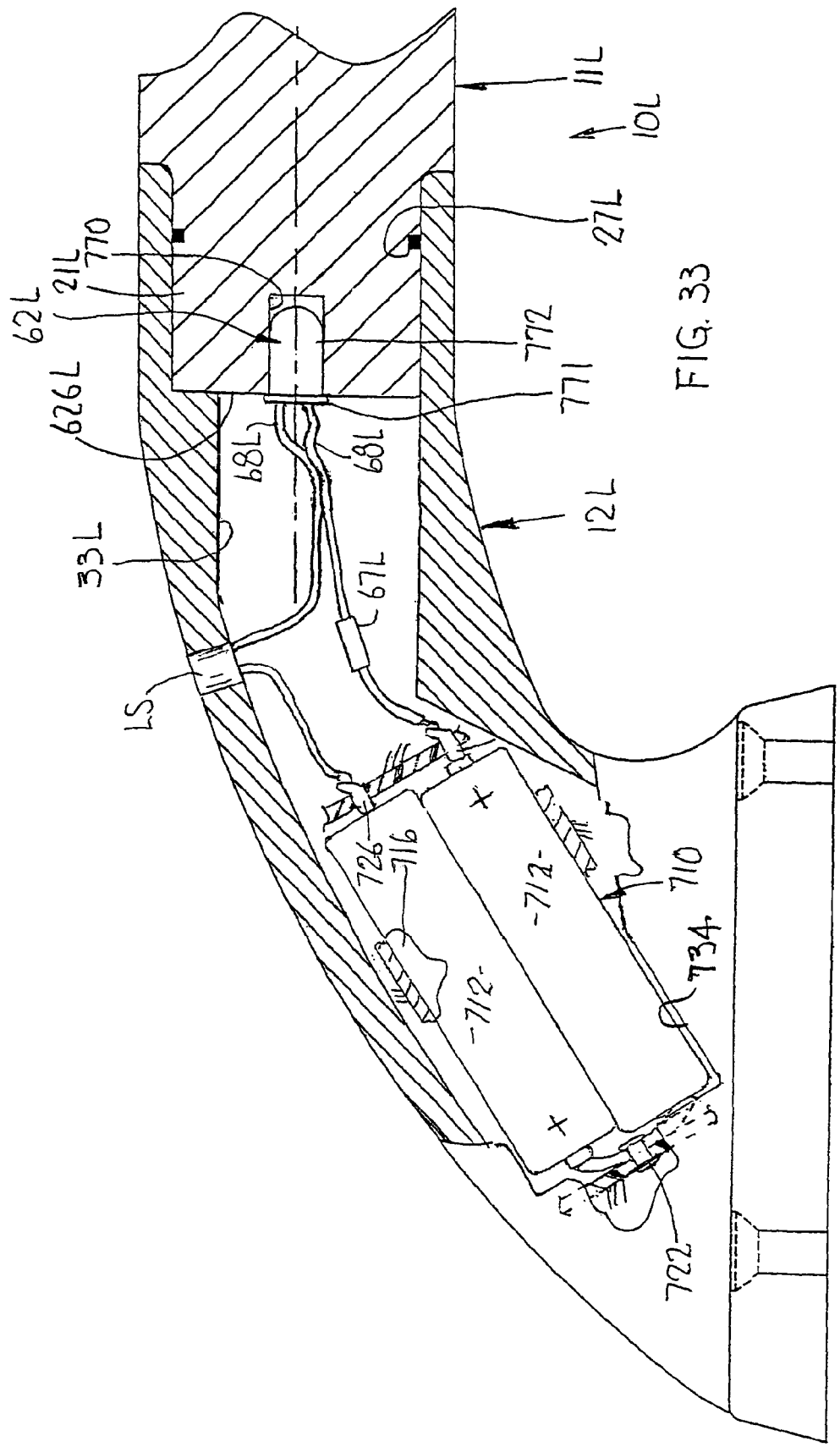
FIG. 33 is a view similar to FIG. 20 but showing a modification.

FIG. 33 discloses a lighted handle 10L. Parts of the lighted handle 10L corresponding to parts of earlier disclosed embodiments will carry the same reference numerals with the suffix "L" added.

FIG. 33 discloses a simplified LED mounting wherein the end 626L of the end portion 21L of the light transmitting bar 11L has a blind hole 770 formed therein, conveniently by milling to provide the planar blind end shown, or by drilling. The blind hole 770 has a length axis preferably parallel to the length axis of the adjacent part of the light transmitting member L. Although the adjacent end portion of the bracket passage 33L is of smaller width than and has a central axis offset from that of the light transmitting bar end portion 21L, the hole 770 and LED 62L are of much smaller diameter then the passage 33L, and hence preferably are located coaxially with the light transmitting bar end portion 21L. The hole 770 is sized to snugly receive the LED 62L. In the embodiment shown, the major forward length portion 772 of the LED 62L extends forward (rightward in FIG. 33) into the hole 770, while the base flange 771 of the LED abuts the end wall 626L of the light transmitting bar 11L. The LED 62L is preferably thus fixed in and with respect to the light transmitting bar 11L and, in the embodiment shown, the bracket 12L.

The LED 62L may be removably disposed in the hole 770 and maintained therein by releasable means such as a friction fit. However, it is also contemplated that the LED 62L may be substantially permanently fixed in the hole 770, as by a suitable adhesive, particularly given the extremely long (e.g. 100,000 hours) expected operating life of a typical LED. If the LED 62L is permanently fixed in the hole 770, it may be desired to substantially permanently fix the end portion 21L of the light transmitting bar 11L to the bracket 12L, as with an adhesive, in which case, the annular seal (e.g. O-ring) 27L may be eliminated.

The LED 62L may be supplied electric current by any convenient means, a number of which are disclosed in detail above, FIG. 33 illustrating for purposes of example only the onboard battery pack comprising cells 712 and light sensing switch LS, of FIG. 20. In the simplified FIG. 33 embodiment, the insulated wires 68 connected to the LED supply operating current thereto. In view of the absence of the illumination unit 61G of FIG. 20, it may be desired to match an LED 62L of one voltage rating with an electrical supply of a somewhat higher voltage rating, as by a suitably sized load resister 67L connected in series with the LED 62L to limit current flow through the LED 62L to a desired level.

Applicants have found desirable the use of light emitting devices which, in contrast to incandescent bulbs, may for convenience be termed "LED-like", namely LEDs and devices of generally comparable or better compactness, low power draw and light output.

Thus, although particular preferred embodiments of the present invention have been disclosed in detail for illustrative purposes, it will be recognized that variations or modifications lie within the scope of the present invention and do not depart from the spirit of the invention.

We claim:

1. A lighted handle, comprising:
   an elongate light transmitting bar having first and second end portions; spaced, first and second mounting brackets which are engagable with a support surface and carry said first and second end portions of said light transmitting bar, said first bracket having a recess in which said first end portion of said bar is fixedly recessed;
   a narrow beam light emitting diode located in said first mounting bracket and aimed longitudinally of said light transmitting member to make said light transmitting member more visible; and
   said recess and bar first end portion have engageable peripheral walls, at least one of which tapers, the central axes of said recess and bar end portion being in one of a range of relative angular positions.

2. The apparatus of claim 1 in which said bar comprises a plastic extrusion, said bar having an intermediate portion of substantially constant cross section between said first and second end portions, at least one said end portion having a machined outer periphery and said bar intermediate portion has an outer peripheral surface with a user grip enhancing contour.

3. The apparatus of claim 2 in which said contour has axially parallel, circumferentially spaced contour elements selected from the group consisting of grooves and ribs.

4. The apparatus of claim 1 wherein said first mounting bracket is hollow, said light transmitting bar having its said first end portion telescoped in said recess in said first mounting bracket, said light emitting diode being fixed in said hollow bracket and aimed at the adjacent end of said light transmitting bar, an electric storage cell replaceably located in said hollow first bracket and connected in circuit with said light emitting diode.

5. The apparatus of claim 4 in which said first bracket has a cell entry/exit portal to facilitate cell replacement.

6. The apparatus of claim 4 in which an ambient light responsive, cell conserving switch is carried by said first bracket and connected in circuit with said light emitting diode and cell.

7. The apparatus of claim 4 in which said hollow first bracket is sized to carry a battery pack at least as large as two commercially available AAA cells.

8. The apparatus of claim 1 including a low voltage electric current supply unit, of voltage lower than conventional AC household electric current and connected in circuit with said light emitting diode,
   said first mounting bracket compactly pocketing said first end portion of said light transmitting bar, said light emitting diode, and said low voltage current supply unit.

9. The apparatus of claim 8 in which said low voltage electric current supply unit comprises an electric storage cell connected in circuit with said light emitting diode, said mounting bracket including a releasable cell holding member replaceably locating said cell.

10. The apparatus of claim 8 in which said low voltage electric current supply unit comprises (1) a 110 volt AC converter circuit having a direct current output path through said light emitting diode, and (2) insulated conductors extending from said handle to a remote 110 volt AC connector device.

11. The apparatus of claim 8 in which said first mounting bracket has an interior through passage, one end of said passage being fixed with respect to said first end portion of said bar, said light emitting diode and at least a portion of said electric current supply unit being disposed in said passage.

12. The apparatus of claim 11 in which said electric current supply unit comprises an electric storage cell replaceably housed in said passage.

13. The apparatus of claim 11 in which said current supply unit comprises an AC-to-DC converter in said passage and insulated AC conductors running from said passage and out of the other end of said through passage.

14. The apparatus of claim 1 in which said elongate light transmitting bar's first end portion has a free end face which is diametrically planar, said light emitting diode having a light emitting end fixed immediately adjacent said diametrically planar bar free end face such that any clearance there between is a minor fraction of the diameter of said light emitting diode.

15. The apparatus of claim 1 in which said elongate light transmitting bar first end portion having a free end which has an axially opening blind-ended hole substantially of the diameter and length of said light emitting diode and snugly housing therein said light emitting diode, said light emitting diode being aimed substantially toward the blind end of said hole.

16. The apparatus of claim 1 in which said recess comprises (1) a relatively larger diameter outboard portion receiving said bar first end portion and (2) a relatively smaller diameter inboard portion receiving said light emitting diode, said recess outboard and inboard portions having longitudinal axes which are parallel but radially spaced.

17. The apparatus of claim 1 in which said light emitting diode is of a type which is structured so as to be self focused in a relatively narrow light beam aimed along a central diode axis wherein the light output of said light emitting diode on said central diode axis is reduced to half at an angle in the range of 15 to 45 degrees off that axis, said light emitting diode being oriented in said first mounting member such that substantially all of the light output of said light emitting diode is applied directly to the opposed end of said light transmitting barmember.

18. The apparatus of claim 1 in which said bar comprises a plastic extrusion, said bar having an intermediate portion of substantially constant cross section between said first and second end portions, at least one said end portion having a machined outer periphery.

19. The apparatus of claim 1, wherein said light emitting diode emits a narrow light beam aimed directly from said light emitting diode to an opposing surface of said first end portion of said light transmitting member.

20. The apparatus of claim 1, wherein said light emitting diode emits a narrow light beam having a central light beam axis extending from said light emitting diode directly to an opposing surface of said first end portion, which said opposing surface faces longitudinally from said light transmitting member toward said light emitting diode in opposing relation therewith.

21. A lighted handle, comprising:
an elongate light transmitting bar having first and second end portions;
spaced, first and second mounting brackets which are engagable with a support surface and carry said first and second end portions of said light transmitting bar, said first bracket having a recess in which said first end portion of said bar is fixedly recessed;
a narrow beam light emitting diode located in said first mounting bracket and aimed longitudinally of said light transmitting member to make said light transmitting member more visible; and
said bar first end portion further having an annular groove, and an annular seal ring bearing on an interior peripheral surface of said recess, said bar first end portion being frictionally, removably, fixed in said recess.

22. A lighted handle, comprising:
an elongate light transmitting bar having first and second end portions flanking a hand graspable intermediate portion;
spaced, first and second, mounting brackets which are engagable with a support surface to which said lighted handle is to be mounted, and which carry said first and second end portions of said light transmitting bar, said first bracket having:
(1) a surface mountable foot,
(2) a hollow leg extending from said foot toward said bar so as to define a free end,
(3) a recess having an axially inner end and opening axially from the free end of said leg and snugly receiving said bar first end portion,
(4) an outward facing coaxial annular step extending radially in from the axially inner end of said recess to define a radially inner edge,
(5) an elongate passage extending at reduced diameter from the radially inner edge of said annular step axially inward further into said leg of said mounting bracket, said passage having an intermediate bend and a remote end opening through said surface mountable foot of said mounting bracket,
said bar first end portion having:
(1) an annular, radially inward extending step abutting the free end of said leg,
(2) a reduced diameter neck extending from said annular step snugly into said recess in said mounting bracket leg
(3) a diametrically extending flat end on said neck axially opposing said outward facing annular step and passage in said leg;
an illumination unit having an inboard portion snugly seated in said passage substantially coaxially with an adjacent said outward facing annular step and having an outboard portion facing substantially coaxially into said recess, said illumination unit including a narrow beam light emitting diode having:
(1) a terminal end substantially coaxially fixed on said illumination unit inboard portion,
(2) a light beam emitting end opposing said flat end of said reduced diameter neck of said light transmitting bar wherein said light beam emitting end emits a narrow light beam, and
(3) and intermediate portion extending lengthwise substantially coaxially with said leg recess and said light transmitting bar reduced diameter neck.

23. The apparatus of claim 22 in which said recess is tapered at not greater than about 4 degrees to accommodate manufacturing variations in angle between the end and intermediate portions of said light transmitting bar.

24. The apparatus of claim 22 in which said illumination unit inboard portion bottoms against said bend.

25. The apparatus of claim 22 in which said light emitting diode is spaced from said bar across a length portion of said recess and has a beam half angle in the range of about 15 to 45 degrees.

26. The apparatus of claim 22 in which said annular steps are substantially coaxially spaced and said light beam emitting end of said light emitting diode is located axially between said annular steps.

27. The apparatus of claim 22 in which said annular step of said light transmitting bar transitions through a rounded annular fillet into the peripheral surface of said reduced diameter neck, the free end of said leg transitioning with an annular round into the inner peripheral surface of said recess of said mounting bracket leg.

28. The apparatus of claim 22 in which said second mounting bracket is similar to said first mounting bracket and said bar second end portion is similar to said bar first end portion but wherein said illumination unit is replaced by a light deflecting unit having a concave reflector opposing the free end of said bar second end portion, said light deflecting unit further including a spacer portion snugly received in the passage of said second bracket and having a free annular edge bottomed against a bend in the inner periphery of the mid-portion of the passage of said second bracket, such that said reflector receives light from said light emitting diode in said first bracket member and transmitted axially through said light transmitting bar and reflects same back through said light transmitting bar toward said light emitting diode.

* * * * *